(12) United States Patent
Tokizawa

(10) Patent No.: US 8,061,015 B2
(45) Date of Patent: Nov. 22, 2011

(54) METHOD OF MANUFACTURING STATOR CORE OF ELECTRIC ROTATING MACHINE

(75) Inventor: Takashi Tokizawa, Nisshin (JP)

(73) Assignee: Denso Corporation, Kariya (JP)

( * ) Notice: Subject to any disclaimer, the term of this patent is extended or adjusted under 35 U.S.C. 154(b) by 411 days.

(21) Appl. No.: 12/232,644

(22) Filed: Sep. 22, 2008

(65) Prior Publication Data

US 2009/0077789 A1   Mar. 26, 2009

(30) Foreign Application Priority Data

Sep. 21, 2007 (JP) .................................. 2007-244803

(51) Int. Cl.
*H02K 15/00* (2006.01)
(52) U.S. Cl. ............................. 29/596; 29/605; 72/136
(58) Field of Classification Search ............ 29/596–598, 29/732–736; 310/254, 216, 52, 42; 72/353.2, 72/354.2
See application file for complete search history.

(56) References Cited

U.S. PATENT DOCUMENTS

| | | | |
|---|---|---|---|
| 4,445,353 A * | 5/1984 | Taleff et al. ...................... | 72/136 |
| 6,308,549 B1 * | 10/2001 | Tokizawa et al. ................ | 72/136 |
| 7,698,803 B2 * | 4/2010 | Mitsui et al. .................... | 29/596 |

FOREIGN PATENT DOCUMENTS

| | | |
|---|---|---|
| JP | A-62-290335 | 12/1987 |
| JP | A-2005-185014 | 7/2005 |
| JP | A-2006-246586 | 9/2006 |

OTHER PUBLICATIONS

Notification of Reasons for Rejection, Japanese Patent Application No. 2007-244803, dated Sep. 15, 2009 (with English translation of the Official Communication).

* cited by examiner

*Primary Examiner* — Minh Trinh
(74) *Attorney, Agent, or Firm* — Oliff & Berridge, PLC

(57) ABSTRACT

In a method of manufacturing a stator core of an electric rotating machine, a cylindrical laminated core is formed by thinning a side portion of a steel plate with magnetic pole teeth and helically winding the steel sheet, and the stator core is manufactured by performing ironing for the laminated core. This laminated core has steel sheets aligned along the axial direction thereof, and the sheets have respective thinned outer end portions spaced apart from one another on the outer side of the laminated core. In the ironing, the thinned outer end portions of the steel sheets are brought into contact with one another in a forming apparatus, and an ironing load is given to the thinned outer end portions to shorten lengths of the thinned outer end portions in the radial direction of the laminated core at a predetermined value.

17 Claims, 10 Drawing Sheets

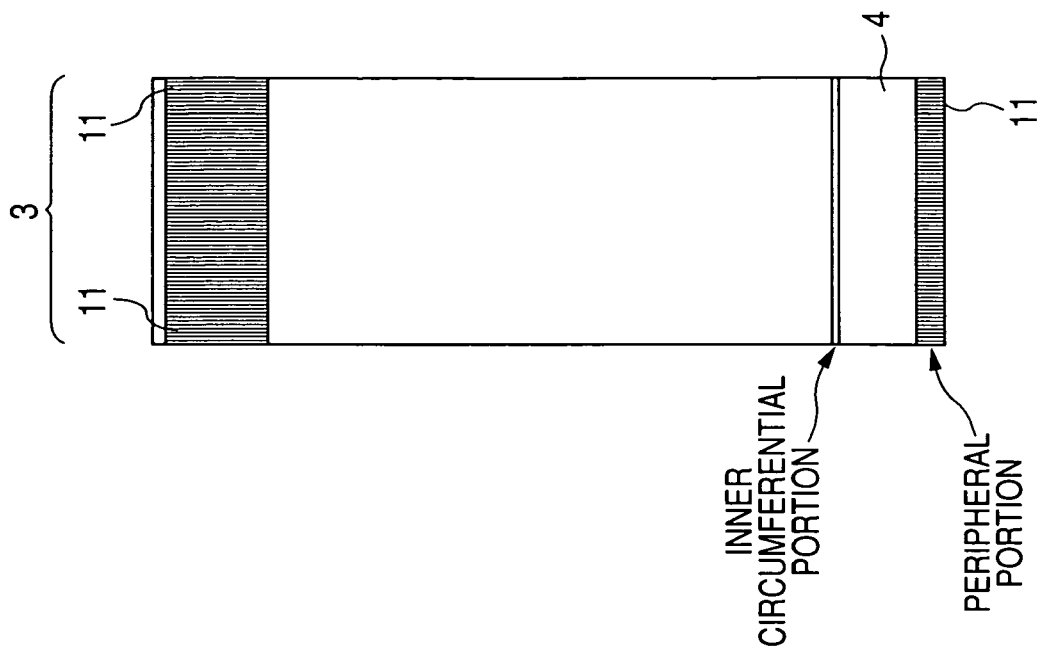
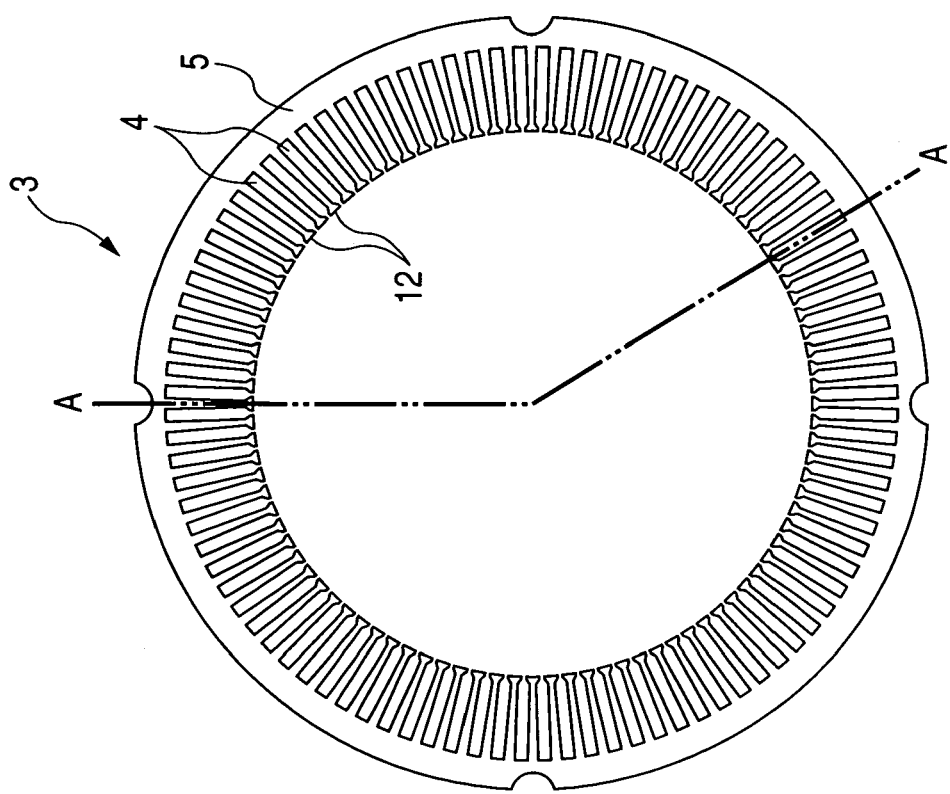

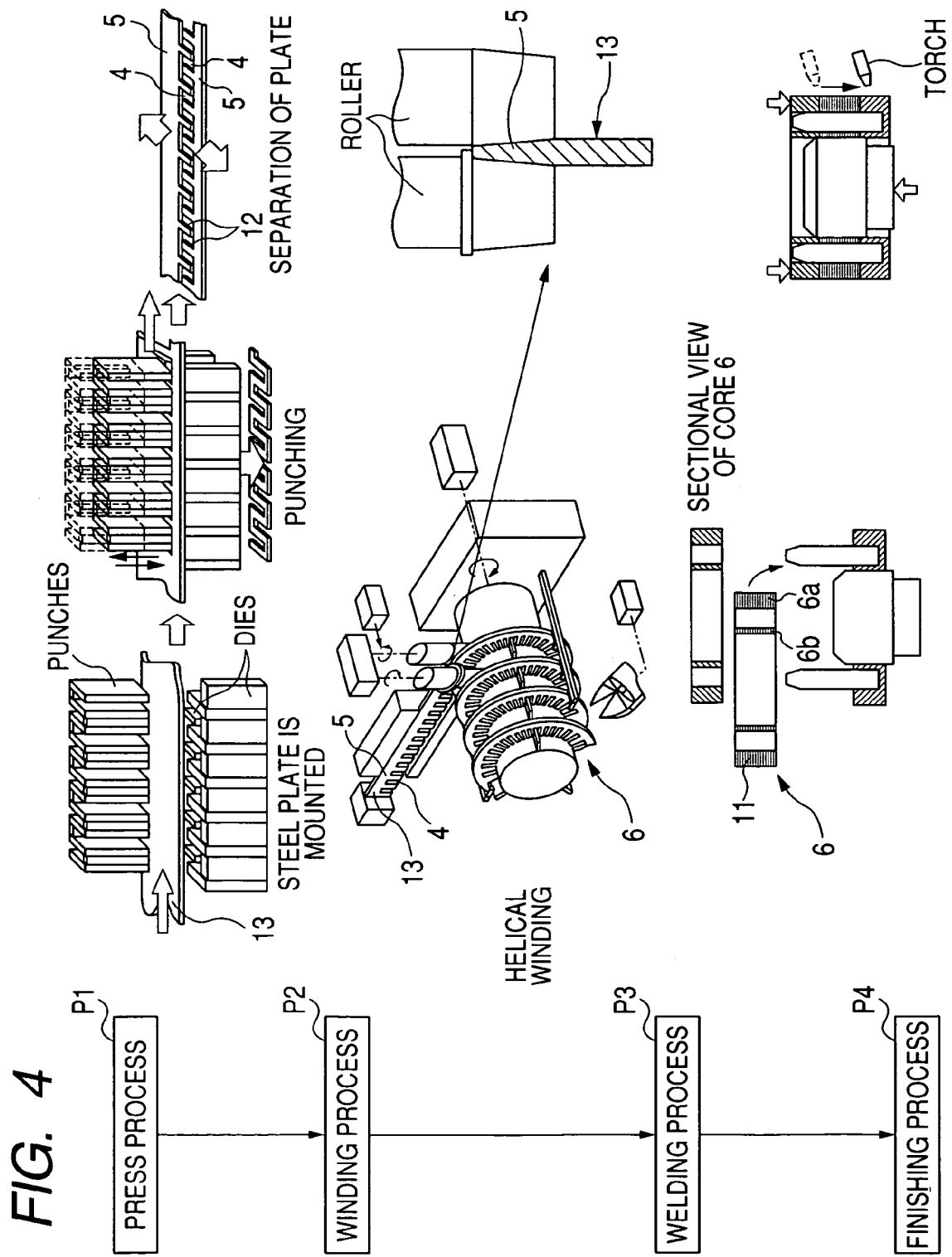

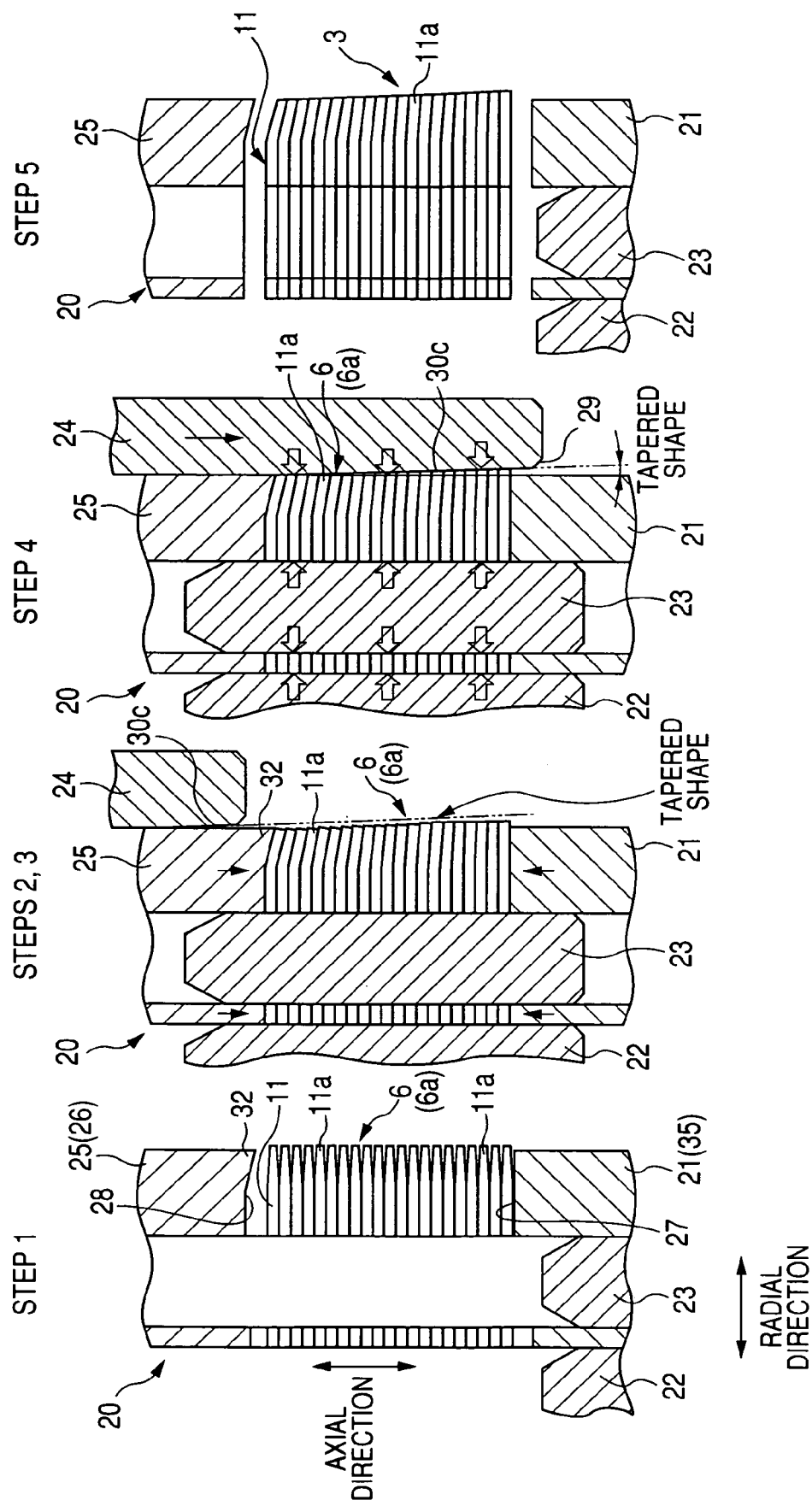

METHOD OF MANUFACTURING STATOR CORE OF ELECTRIC ROTATING MACHINE

CROSS-REFERENCE TO RELATED APPLICATION

This application is based upon and claims the benefit of priority of the prior Japanese Patent Application 2007-244803 filed on Sep. 21, 2007, so that the contents of which are incorporated herein by reference.

BACKGROUND OF THE INVENTION

1. Field of the Invention

The present invention relates to a method of manufacturing a stator core of an electric rotating machine by thinning outer end portions of steel sheets of the core and performing ironing for the outer end portions.

2. Description of Related Art

A small-sized electric rotating machine efficiently generating a rotational force or electric power has been recently desired. In an alternator representing the machine, a stator core formed of a lamination of steel sheets is disposed, and a conductor is wound on the stator core so as to be received in slots of the core and to be protruded from both ends of the slots as coil ends. To manufacture a small-sized alternator efficiently generating electric power, it is required to densely dispose the conductor in the slots and to densely form the coil ends. Therefore, the number of slots has been inevitably increased while the intervals of the slots are narrowed.

Further, to efficiently generate electric power in the alternator, the strength of the magnetic field induced in the stator core has been heightened. In this case, iron loss in the core caused during the operation of the alternator is undesirably increased. More specifically, a magnetic field is induced in a rotor and a stator in response to an alternating current flowing in the rotor, and the induced direction of this magnetic field is changed in a cycle equal to that of the alternating current. In the core of the stator, eddy currents are produced in response to the changing magnetic field, so that iron loss is caused by the eddy currents in the stator core. The magnitude of the iron loss is proportional to the strength of the magnetic field, the second power of the cycle of the magnetic field, and the second power of the thickness of the steel sheet. When the cycle of the magnetic field is reduced by lowering the rotation speed of the alternator, the level of the electric power is undesirably lowered. Therefore, to reduce the iron loss in the stator core while maintaining the electric power, it is required to reduce the thickness of the steel sheet. However, when the steel sheet is thinned, the mechanical strength of the steel sheet is lowered. In this case, the steel sheet is easily deformed or bent along the axial direction of the stator core.

A helically-laminated core has been generally used as a stator core of the electric rotating machine. To form this laminated core, a long steel plate having magnetic pole teeth on one side of the sheet is press-formed, and the steel plate is helically wound to obtain a plurality of ring-shaped steel sheets disposed in layers as a cylindrical-shaped laminated core. Each ring-shaped steel sheet has the magnetic teeth and slots alternately arranged along the circumferential direction of the sheet on the inner side of the sheet. Further, before the long steel plate is wound, the other side portion of the plate is thinned by a roller or the like so as to lengthen the peripheral portion of each steel sheet. Therefore, the long steel plate can be easily wound.

After the laminated core composed of the ring-shaped steel sheets is obtained, positions of the sheets are minutely adjusted in each of the radial and circumferential directions of the lamination so as to align the sheets within a permissible range in the radial and circumferential directions. Then, the peripheral portions of the sheets are partially welded to one another to fix the positional relationship of the sheets aligned in the radial and circumferential directions. Then, in a finishing process, ironing (or shaving) is performed for the laminated core to adjust the circularity of the core at the outer diameter, the concentricity between inner and outer portions of the core, and the perpendicularity of each sheet to the axial direction of the core. Therefore, the stator core is formed from the laminated core in the ironing. This ironing is, for example, disclosed in Published Japanese Patent First Publication No. 2006-246586.

In this Publication, a stator core forming apparatus is disclosed. This apparatus forms a stator core by performing the ironing for a laminated core. To form the stator core, this apparatus has a work receiving member holding the laminated core, a first pressing member supporting the work receiving member, an inner diameter forming member fixedly disposed to align and reshape inner portions of steel sheets of the stator core, a pushing member pushing the laminated core to the work receiving member to move the laminated core with the work receiving member, a slot correcting member correcting slots of the stator core, a second pressing member moving the pushing member and the slot correcting member, an outer diameter forming member holding the pushing member and the second pressing member and performing ironing for outer portions of the steel sheets of the laminated core, and a third pressing member moving the outer diameter forming member. When the pressing force of the second pressing member is set to be larger than the pressing force of the first pressing member, the laminated core is pushed by the pushing member and is moved down with the work receiving member, the inner diameter forming member aligns and reshapes the inner portions of the laminated core to form the inner portion of the stator core by adjusting the inner diameter of the laminated core. When the pressing force of the third pressing member is set to be larger than the pressing force of the second pressing member, the outer diameter forming member is moved down to perform the ironing for the outer portions of the laminated core. That is, the outer diameter of the laminated core is adjusted, so that the outer portion of the stator core is formed.

In the ironing for the outer portions of the steel sheets composing the laminated core, when an outer die denoting the outer diameter forming member is moved up and down, the outer portions of the laminated core are pushed into an inner hollow of the outer die while receiving the plastic deformation.

Therefore, the inner and outer diameters and the slots of the laminated core can be simultaneously adjusted in one process to form one stator core. Further, a plurality of stator cores can be successively formed. As a result, the cost for the facility forming the stator cores can be reduced, and the processing time required to form the stator cores can be shortened.

However, in the ironing for the outer portions of the steel sheets of the laminated core, because the outer portions are thinned, the outer portions are spaced apart from one another through openings along the axial direction. In this case, before the plastic deformation directed in the radial direction is caused during the ironing in the outer portions in response to the pressing load added to the outer portions, the pressing load initially induces the outer portions to be deformed or bent toward the axial direction of the laminated core. Therefore, the outer portion of a specific steel sheet having a larger outer diameter is easily moved with the outer die so as to reduce the ironing load given to the outer portion, and the outer portion of the specific steel sheet is largely bent so as to discontinuously form a large opening between this sheet and one adjacent sheet.

This large opening (hereinafter, called inter-sheet opening) is not good in view of the external appearance of the stator core. Regarding the quality of the stator core, the stator core is easily rusted at the bent portion forming the inter-sheet opening. Regarding the performance of the stator core, the inter-sheet opening increases the magnetic resistance of the stator core so as to lower the strength of the magnetic field, and electric power outputted from an alternator using this stator core is undesirably lowered. Regarding the mechanical strength of the stator core, when each of though bolts fastens the steel sheets of the stator core to one another along the axial direction of the core through frames attached to respective axial ends of the core, the inter-sheet opening prevents the sheets from uniformly receiving the fastening force. Therefore, it is difficult to reliably hold the steel sheets in the alternator.

The mechanism of generating the inter-sheet opening at the peripheral end of the laminated core will be described with reference to FIG. 1A to FIG. 1C. FIG. 1A is a sectional view of the core forming apparatus disposing a laminated core.

As shown in FIG. 1A, a laminated core 102 helically wound is mounted on a work receiving member 103, a pushing member 107 is moved down to press one axial end of the laminated core 102 and to place the core 102 between the members 103 and 107. Then, a slot correcting member 105 is moved up to align the slots of the core 102 along each of the axial and circumferential directions. Then, an inner diameter forming member 104 is moved up to align and reshape the inner portions of the core 102. Therefore, the sheets of the core 102 are positioned in the apparatus 100 in each of the radial and circumferential directions of the core 102. Then, an outer diameter forming member 106 is moved down.

FIG. 1B is an explanatory view of the ironing not yet performed for outer portions of the core 102, while FIG. 1C is an explanatory view of the ironing now performed for outer portions of the core 102.

As shown in FIG. 1B, the outer portions of the sheets are thinned so as to form a tapered opening between the adjacent outer portions in each pair. Therefore, although the sheets of the laminated core 102 are in contact with one another, the thinned outer portions are spaced apart from one another along the axial direction. Further, because the sheets are positioned so as to adjust the inner circumferential surfaces of the sheets along the axial direction of the core 102, the outer ends of the sheets are placed at various positions in the axial direction, and the outer diameter of each sheet is set at various values along the circumferential direction. Therefore, when the ironing load is given to the core 102 along the axial direction, the ironing load received in the outer portions of the sheets has various magnitudes along each of the axial and circumferential directions.

Therefore, as shown in FIG. 1C, during the ironing for the outer portions of the sheets, because each outer portion facing openings formed on both axial sides thereof is movable along the axial direction, some outer portions are easily deformed and bent along the axial direction in response to the ironing load. In this case, the ironing load used for the plastic deformation directed toward the radial direction is reduced. Further, the bending level of the sheet depends on the length of the outer diameter of the sheet, so that the outer portions of some sheets are bent by various amounts. Therefore, when two sheets adjacent to each other are largely different from each other in outer diameter, the opening between the sheets is enlarged and changed to an inter-sheet opening.

Further, the whole opening along the circumferential direction between two outer portions of the sheets is not changed to this inter-sheet opening, but the inter-sheet opening is discontinuously formed along the circumferential direction. Particularly, the inter-sheet opening is easily formed near the welded point of the outer portions. The reason is as follows. When steel sheets are welded to each other, the hardness in the welded portion becomes higher than that in the non-welded portion, so that the welded portion is hardly bent. In contrast, a non-welded portion placed near the welded portion is easily bent. Therefore, the inter-sheet opening is easily formed near the welded point of the outer portions.

Moreover, as described above, the steel sheets of the stator core have been thinned to reduce the iron loss caused in the core, so that the rigidity or mechanical strength of the steel sheets along the axial direction is inevitably lowered. Therefore, each sheet is further easily deformed and bent in response to the ironing load, and the inter-sheet opening is formed at a higher probability. To manufacture a stator core composed of steel sheets having thinned outer portions, it is important to prevent the stator core from forming any inter-sheet opening between outer portions of sheets during the ironing for the outer portions of the sheets.

SUMMARY OF THE INVENTION

An object of the present invention is to provide, with due consideration to the drawbacks of the conventional stator core manufacturing method, a method of manufacturing a stator core of an electric rotating machine wherein ironing is performed for steel sheets of the stator core to precisely adjust the outer diameter of the stator core while preventing the formation of any inter-sheet opening.

According to an aspect of this invention, the object is achieved by the provision of a method of manufacturing a stator core of an electric rotating machine, comprising the step of helically winding a steel plate with a plurality of magnetic pole teeth while thinning a side portion of the steel plate to form a cylindrical laminated core which has a plurality of steel sheets aligned along an axial direction of the laminated core such that the steel sheets have the magnetic pole teeth on an inner side of the laminated core and have respective thinned outer end portions spaced apart from one another on an outer side of the laminated core, and the step of performing ironing for the thinned outer end portions of the steel sheets to form the stator core from the laminated core. The step of performing the ironing includes bringing the thinned outer end portions of the steel sheets into contact with one another, and giving an ironing load to the thinned outer end portions to shorten lengths of the thinned outer end portions in a radial direction of the laminated core at a predetermined value.

Because the thinned outer end portions of the steel sheets are brought into contact with one another, each thinned outer end portion heightens the resistance to the ironing load directed in the axial direction and is hardly deformed, bent or buckled toward the axial direction. Therefore, when the ironing load is given to each thinned outer end portion, no inter-sheet opening is formed between the thinned outer end portions, but plastic deformation directed toward the radial direction is easily caused in the thinned outer end portion. This plastic deformation is uniformly distributed along the circumferential direction of the laminated core. Therefore, in response to the ironing load, each thinned outer end portion is uniformly set back along the circumferential direction.

Accordingly, when each thinned outer end portion is set back along the circumferential direction in response to the ironing load, the length of the thinned outer end portion in the radial direction can be uniformly shortened along the circumferential direction, the length of the thinned outer end portion can be uniformly shortened along the circumferential direction, and the lengths of the thinned outer end portions can be precisely shortened at the predetermined value. That is, the outer diameter of the stator core can be precisely adjusted.

Further, because each thinned outer end portion heightens the resistance to the ironing load directed in the axial direction, this method can prevent any inter-sheet opening from being formed between the thinned outer end portions.

BRIEF DESCRIPTION OF THE DRAWINGS

FIG. 3A is a plan view of the stator core shown in FIG. 2;

FIG. 3B is a sectional view taken substantially along line A-A of FIG. 3A;

FIG. 4 is a view schematically showing a method of manufacturing the stator core shown in FIG. 3A according to embodiments of the present invention;

FIG. 10 shows enlarged sectional views of the peripheral portion of the laminated core at steps of the finishing process according to a modification of the second embodiment.

DETAILED DESCRIPTION OF THE PREFERRED EMBODIMENTS

Figure 1A:
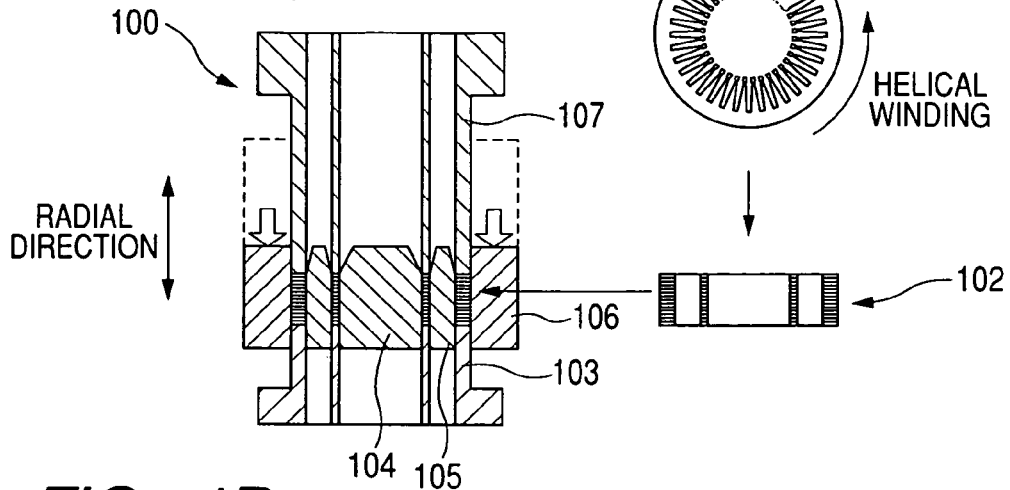
FIG. 1A is a sectional view of a core forming apparatus disposing a laminated core according to a prior art.
Figure 1B:
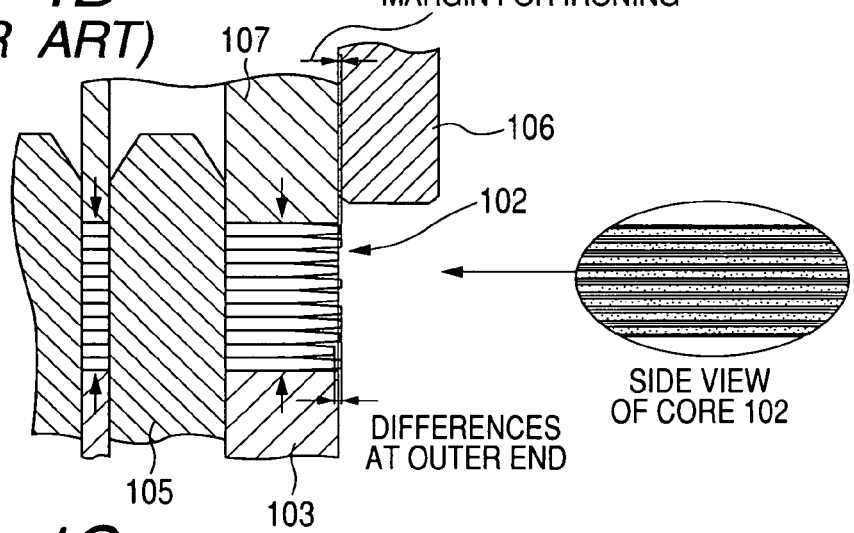
FIG. 1B is an explanatory view of the ironing not yet performed for outer portions of the core shown in FIG. 1A.
Figure 1C:
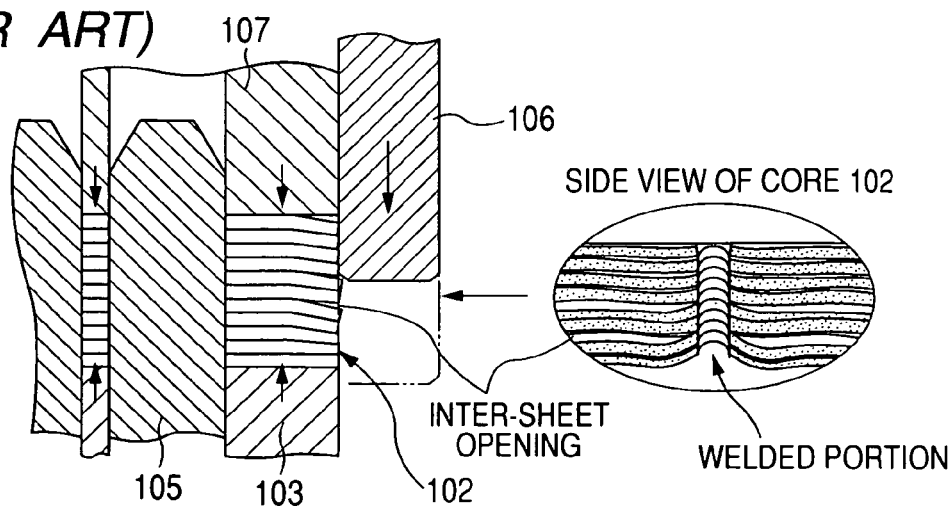
FIG. 1C is an explanatory view of the ironing now performed for outer portions of the core shown in FIG. 1A.

Embodiments of the present invention will now be described with reference to the accompanying drawings, in which like reference numerals indicate like parts, members or elements throughout the specification unless otherwise indicated.

Embodiment 1

Figure 2:
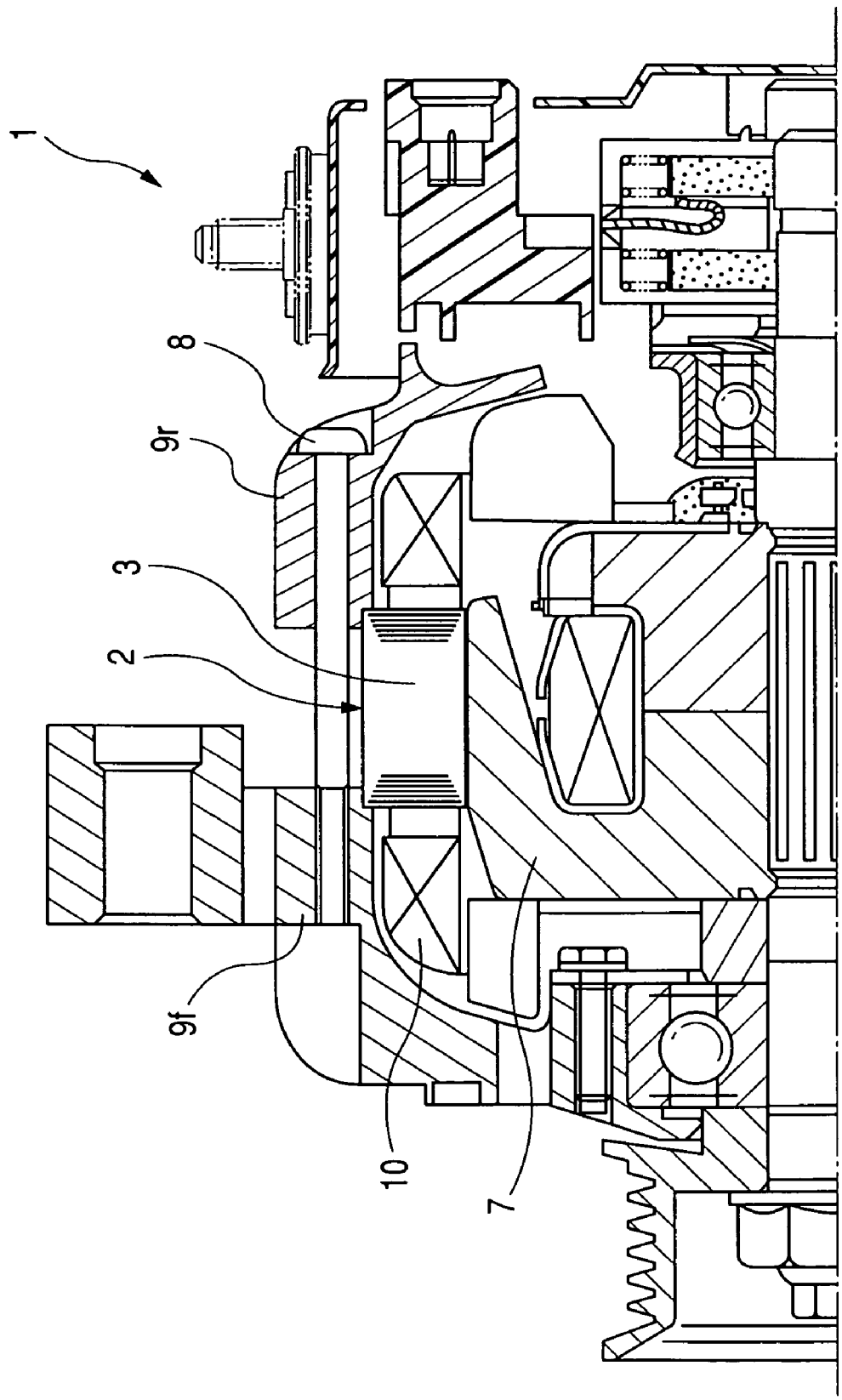
FIG. 2 is a side view, partially in cross-section, of an upper half portion of an alternator with a stator core manufactured according to embodiments of the present invention.

A method of manufacturing a stator core of an alternator representing an electric rotating machine mounted in a vehicle will be described. FIG. 2 is a side view, partially in cross-section, of an upper half portion of an alternator with a stator core.

As shown in FIG. 2, an alternator 1 has a cylindrical stator 2, a columnar rotor 7 disposed in a center hole of the stator 2, a front frame 9f covering the stator 2 and the rotor 7 on the front side of the alternator 1, a rear frame 9r covering the stator 2 and the rotor 7 on the rear side of the alternator 1, and a plurality of through bolts 8 fastening the stator 2 to the frames 9f and 9r. The stator 2 has a cylindrical stator core 3 and a plurality of stator coils 10 wound on the core 3. The core 3 is fixed to the frames 9f and 9r by the through bolts 8. The rotor 7 acts as a field. The stator 2 acts as an armature.

With this structure of the alternator 1, when the rotor 7 is rotated on its own axis in response to an external rotational force, a magnetic field rotated with the rotor 7 is induced in the rotor 7. In response to this magnetic field, the stator core 3 is magnetized, and an alternating current is generated in the stator coils 10. This alternating current is rectified to a direct current, and electric power of the direct current is outputted from the alternator 1.

FIG. 3A is a plan view of the stator core 3, while FIG. 3B is a sectional view taken substantially along line A-A of FIG. 3A.

As shown in FIG. 3A and FIG. 3B, the stator core 3 has a plurality of ring-shaped steel sheets 11 disposed in layers. These sheets 11 are obtained by press-forming magnetic pole teeth 12 on one side of a long steel plate and helically winding the steel plate in a cylindrical shape. Each steel sheet 11 has a ring-shaped peripheral (or yoke) portion 5 disposed on the outer side of the sheet 11 and a plurality of magnetic pole teeth 12 disposed on the inner side of the sheet 11. Each tooth 12 extends from the portion 5 toward the inner side of the sheet 11. The teeth 12 and slots 4 are alternately disposed along the circumferential direction of the sheet 11, and the teeth 12 are arranged at equal intervals. The stator coils 10 (see FIG. 2) are received in the slots 4 so as to be wound on the core 3. The portions 5 of the sheets 11 form a peripheral portion of the stator core 3. The inner ends of the teeth 12 of the sheets 11 form an inner circumferential portion of the stator core 3. For convenience of explanation, the teeth 12 of the sheets 11 also form a plurality of teeth 12 of the stator core 3, and the slots 4 of the sheets 11 also form a plurality of slots 4 of the stator core 3.

A manufacturing method of the stator core 3 will be described with reference to FIG. 4 and FIG. 5. FIG. 4 is a view schematically showing a method of manufacturing the core 3 according to a first embodiment of the present invention.

As shown in FIG. 4, the method of manufacturing the stator core 3 has a press process P1 for press-forming the teeth 12 in a long steel plate 13, a winding process P2 for helically winding the plate 13 to form a laminated core 6 composed of steel sheets 11, a welding process P3 for partially welding the sheets 11 to one another, and a finishing process P4 for aligning and reshaping the teeth 12 and the inner portions of the sheets 11 and performing ironing (or shaving) for the periphery portions of the sheets 11 to form the stator core 3 from the laminated core 6.

In the process P1, the steel plate 13 is moved on dies of a press working machine in the longitudinal direction of the plate 13 and is punched to form the teeth 12 on one side of the plate 13. This press working is performed in the machine while cutting the plate 13 at a predetermined length or while successively forming the teeth 12 in the plate 13 without cutting the plate 13. Therefore, the teeth 12 and slots 4 are alternately formed along the longitudinal direction on one side of the steel plate 13.

In the process P2, a laminated core 6 composed of ring-shaped steel sheets 11 disposed in layers is formed by helically winding the plate 13 so as to place the teeth 12 on the inner side of each sheet 11. The sheets 11 are aligned along the axial direction of the core 6. The laminated core 6 has a peripheral portion 6a and an inner circumferential portion 6b. The portion 6a is composed of periphery portions of the steel sheets 11. The portion 6b is composed of the inner end portions of the steel sheets 11. In this winding, before the plate 13 is wound, the side portion of the plate 13 opposite to the teeth 12 is thinned by a roller or the like to lengthen the thinned portion along the longitudinal direction of the plate 13. The thinned portion of the plate 13 forms a thinned outer end portion 11a of each sheet 11. Because the length of the thinned end portion 11a in each steel sheet 11 along the circumferential direction of the core 6 becomes longer than the non-thinned portion of the sheet 11, the plate 13 can be easily wound.

In the process P3, the laminated core 6 having a predetermined number of sheets 11 is disposed in a position adjusting device, positions of the sheets 11 aligned with one another are minutely adjusted. That is, differences in positions of the inner ends of the sheets 11 and differences in positions of the slots 4 are set within a permissible range in each of the radial and circumferential directions of the core 6. Then, the thinned end portions 11a of the sheets 11 are partially welded to one another by a welding torch so as to fix the positional relationship among the sheets 11.

In the finishing process P4, the laminated core 6 is disposed in a core forming apparatus, and the apparatus forms a stator core from the laminated core 6 by precisely adjusting the circularity of the core 6 at the outer diameter, the concentricity between the inner and outer end portions of the core 6, and the perpendicularity of each sheet 11 to the axial direction of the core 6. When the circularity, concentricity and perpendicularity are obtained with high accuracy, the core 6 is taken out from the forming apparatus as the stator core 3 having the steel sheets 11.

Figure 5:
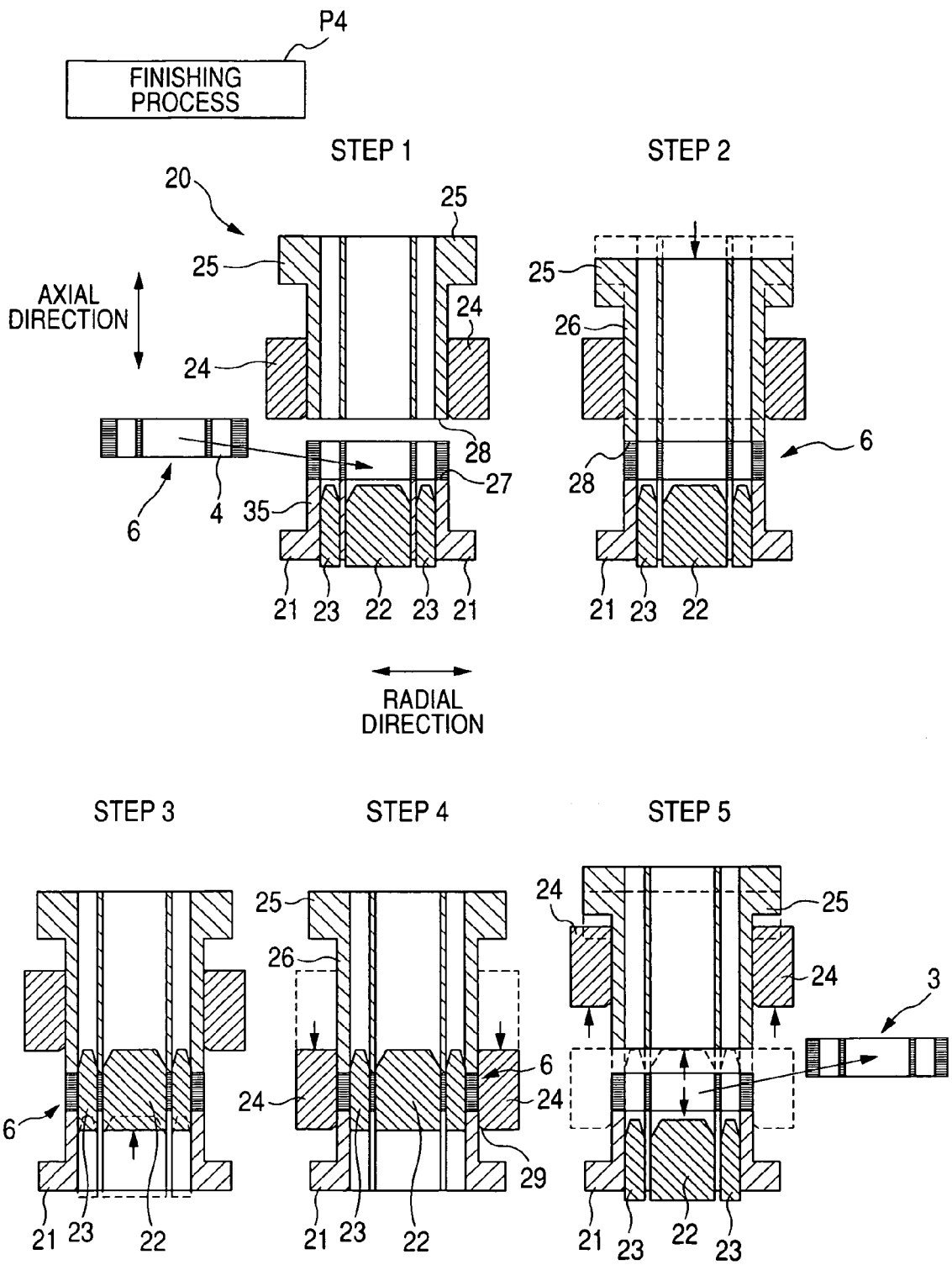
FIG. 5 shows longitudinal sectional views of a forming apparatus for forming a stator core from a laminated core in a finishing process according to embodiments of the present invention.

FIG. 5 shows longitudinal sectional views of a forming apparatus for forming a stator core from the laminated core 6 in the finishing process P4.

As shown in FIG. 5, a forming apparatus 20 has a cylindrical work receiving member 21 for receiving the peripheral portion 6a and the inner circumferential portion 6b of the laminated core 6, a columnar inner diameter core member 22 for reshaping the inner circumferential portion 6b of the core 6 disposed on the receiving member 21 to make uniform inner diameters of the steel sheets 11 of the core 6 along each of the axial and circumferential directions, a slot aligning member 23 for reshaping the teeth 12 of the core 6 to flatten the walls of the slots 4 of the core 6 along the axial direction of the core 6 and to align the slots 4 at equal intervals along the circumferential direction, an outer diameter ironing ring member 24 for performing the ironing for the thinned end portions 11a of the sheets 11 to make uniform outer diameters of the steel sheets 11 along each of the axial and circumferential directions, a work pressing member 25 for pressing the core 6 onto the member 21, and a driving unit such as a hydraulic press (not shown) for driving the members 21 to 25.

The receiving member 21 is fixed in the apparatus 20. The member 21 has a cylindrical portion 35 on which the peripheral portion 6a of the core 6 received in the member 21 is disposed. The work pressing member 25 has a cylindrical portion 26 being in contact with the peripheral portion 6a of the core 6. The portions 26 and 35 are coaxially disposed with each other and face each other. The portions 26 and 35 have the same outer diameter. However, the portions 26 and 35 may have outer diameters slightly different from each other. The outer diameter of each of the portions 26 and 35 is set to be slightly smaller than the outer diameter of the core 6. Therefore, the thinned end portions 11a of the core 6 placed between the members 21 and 25 are protruded from the members 21 and 25 toward the outer side.

Figure 6:
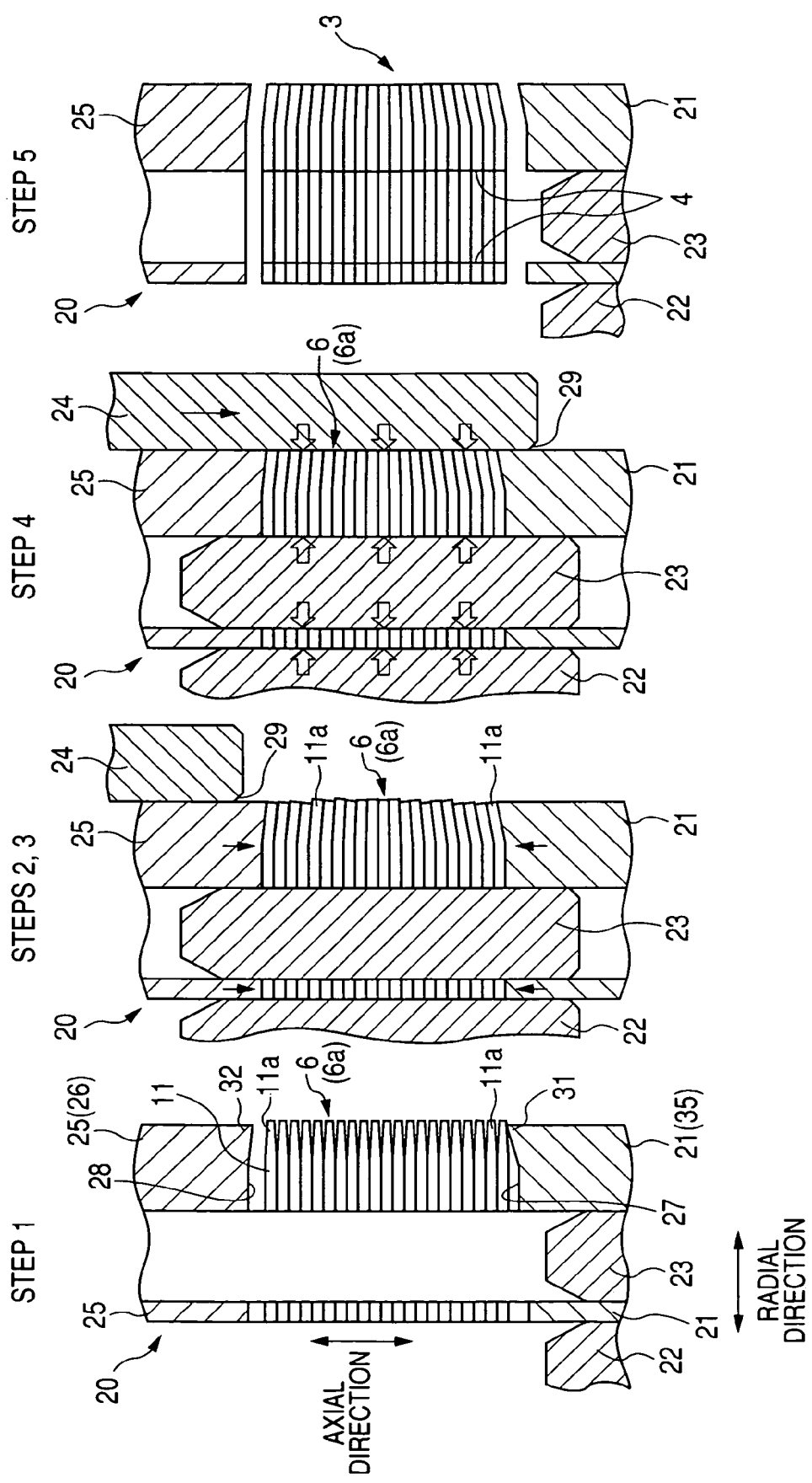
FIG. 6 shows enlarged sectional views of a peripheral portion of the laminated core at steps of the finishing process according to the first embodiment.

FIG. 6 is enlarged sectional views of the peripheral portion 6a of the core 6 at steps of the finishing process P4 according to the first embodiment.

As shown in FIG. 6, when the core 6 is received in the member 21, an upper end surface 27 of the member 21 faces the lower end surface of the periphery portion of the core 6 in the axial direction. The member 21 has a protrusion 31 on the outer area of the upper end surface 27. The protrusion 31 protrudes toward the member 25 along the axial direction. The protrusion 31 is formed in a tapered shape in section such that the depth of the protrusion 31 in the axial direction is gradually increased toward the outer side of the member 21. Therefore, the protrusion 31 causes the core 6 disposed on the member 21 to be coaxially placed with the member 21.

When the core 6 is received in the member 21, a lower end surface 28 of the member 25 faces the upper end surface of the periphery portion 6a of the core 6 in the axial direction. The member 25 has a protrusion 32 on the outer area of the lower end surface 28. The protrusion 32 protrudes toward the member 21 along the axial direction. The protrusion 32 is formed in a tapered shape in section such that the depth of the portion 32 in the axial direction is gradually increased toward the outer side of the member 25. Therefore, the protrusion 32 causes the core 6 to be coaxially placed with the member 25.

The finishing process P4 will be described in detail with reference to FIG. 5 and FIG. 6.

At step S1 of the process P4, the receiving member 21 of the apparatus 20 receives the laminated core 6 welded in the welding process P3 such that the lower end of the core 6 is disposed on the upper end surface 27 of the member 21. Because the member 21 has the protrusion 31 on the upper end surface 27, the member 21 and the core 6 can be easily set to be coaxial with each other.

At step S2 of the process P4, the member 25 is moved down by a driving member (not shown) and comes in contact with the upper end of the core 6 so as to press the core 6 to the member 21. Therefore, the core 6 is fixed between the members 21 and 25. Because the member 25 has the protrusion 32 on the lower end surface 28, the member 25 and the core 6 can be easily set to be coaxial with each other. Further, the protrusions 31 and 32 cause the thinned end portions 11a of the sheets 11 of the core 6 to be brought into contact with one another along the axial direction.

At step S3 of the process P4, the member 23 is moved up by the driving member and is inserted into the slots 4 of the core 6 from the lower end of the core 6. The member 23 reshapes the teeth 12 of the core 6 to precisely adjust positions of the slots 4 in each of the radial and circumferential directions of the core 6. Therefore, the member 23 flattens each of the walls of the slots 4 of the core 6 along the axial direction of the core 6. Accordingly, the slots 4 of the core 6 can have the same width in the circumferential direction and can be disposed at equal intervals.

Then, the member 22 is moved up by the driving member and is inserted into the center hole of the core 6 from the lower end of the core 6. The member 22 reshapes the inner circumferential portion 6b of the core 6 to place the inner ends of the teeth 12 at the same position in the radial direction. Therefore, the member 22 makes uniform inner diameters of the steel sheets 11 of the core 6 and makes uniform the inner diameter of each steel sheet 11 along the circumferential direction of the core 6. Accordingly, the circularity of the core 6 at the inner diameter can be obtained with high precision.

At step S4 of the process P4, the ring member 24 is moved down by the driving member while being slid on the outer surface of the member 25. The member 24 performs the ironing for the thinned end portions 11a of the sheets 11 of the core 6. The member 24 is made of a hard material such as cemented carbide. The inner surface of the member 24 is slidably fitted to the outer surface of the portion 26 of the pressing member 25. The inner diameter of the member 24 is the same as or slightly larger than the outer diameter of the portion 26 of the pressing member 25. The inner diameter of the member 24 is slightly smaller than the outer diameter of the core 6. The half of the difference between the outer diameter of the core 6 and the inner diameter of the member 24 corresponds to a margin for ironing. The difference is set so as to appropriately set the margin for ironing.

In response to the ring member 24 moved down toward the receiving member 21, the ironing load or force directed in the axial direction of the core 6 is given or applied to the thinned end portions 11a of the sheets 11 of the core 6. Therefore, plastic deformation is caused in the thinned end portions 11a protruded by the appropriate margin for ironing so as to push the thinned end portions 11a toward the outer side in the radial direction, and ends of the thinned end portions 11a are set back. Accordingly, the member 24 can adequately perform the ironing for the thinned end portions 11a of the core 6 to set back ends of the thinned end portions 11a protruded from the members 21 and 25 to uniformly adjust the outer diameters of the sheets 11 of the stator core 6.

Further, the member 24 has a chamfered portion 29 on the inner side of its lower end surface so as to face the thinned end portions 11a of the sheets 11. The chamfered portion 29 is formed by cutting a corner of the member 24 in a tapered shape. The chamfered portion 29 has an angle of incidence to each thinned end portion 11a extending along the radial direction so as to make an acute angle with the thinned end portion 11a and to smoothly set back the thinned end portion 11a. In response to the ring member 24 moved down toward the receiving member 21, the ironing load directed in the radial direction of the core 6 is also given to the core 6. Therefore, the chamfered portion 29 of the member 24 promotes the plastic deformation of the core 6 in the radial direction. Accordingly, the ironing for the core 6 can be further reliably and precisely performed by the member 24.

When the ring member 24 is moved down, the member 24 causes the plastic deformation in the thinned end portion 11a of each sheet 11 while pushing the thinned end portion 11a toward the outer side. Therefore, the ironing is performed for the thinned end portions 11a of the core 6, and the thinned end portions 11a are set back. Accordingly, the core 6 can precisely obtain the circularity at the outer diameter, the concentricity between the inner and periphery portions 6a and 6b of the core 6, and the perpendicularity of each sheet 11 to the axial direction of the core 6.

At step S5 of the process P4, the members 24 and 25 are moved up, and the members 22 and 23 are moved down to release the core 6 from the apparatus 20. Then, the core 6 is taken out as the stator core 3 from the apparatus 20. Therefore, the finishing process P4 is completed. That is, the stator core 3 can be obtained by performing the ironing for the core 6 in the process P4.

The action of the protrusions 31 and 32 of the members 21 and 25 in the process P4 will be described in more detail with reference to FIG. 6.

The sum of the depths (or protruding lengths) of the protrusions 31 and 32 in the axial direction is set at any radial-directional positions to be substantially equal to the sum of the axial widths of spaces opened among the thinned end portions 11a of the sheets 11. Therefore, when the member 25 presses the core 6 on the member 21, the thinned end portions 11a of the sheets 11 are bent or deformed toward the axial direction to be in contact with one another. The depths of the protrusions 31 and 32 may be equal to each other or may be differentiated from each other.

The widths of the protrusions 31 and 32 in the radial direction are set to be substantially equal to or slightly smaller than the length of the thinned end portions 11a in the radial direction. Therefore, the thinned end portions 11a of the sheets 11 pressed by the members 21 and 25 are slightly protruded from the members 21 and 25 toward the outer side.

As shown in FIG. 6, at step S1 of the finishing process P4, the core 6 is disposed on the member 21 such that the thinned end portions 11a of the sheets 11 of the core 6 are spaced apart from one another.

At step S2 of the process P4, the member 25 presses the core 6 on the member 21, so that the protrusions 31 and 32 of the members 21 and 25 lead the core 6 to coaxially place the core 6 with the members 21 and 25. Further, the thinned end portions 11a of the steel sheets 11 placed at the upper half of the core 6 are deformed or bent toward the member 21 along the shape of the protrusion 32, and the thinned end portions 11a of the steel sheets 11 placed at the lower half of the core 6 are deformed or bent toward the member 21 along the shape of the protrusion 31.

In response to this deformation or bending, the protrusions 31 and 32 cause the thinned end portions 11a, which are spaced apart from one another through the opened spaces formed among the thinned end portions 11a, to be brought into contact with one another along the axial direction. Further, the thinned end portions 11a deformed or bent are slightly protruded from the members 21 and 25 toward the outer side. This protrusion of the core 6 acts as the margin for the ironing performed by the member 24.

At step S3 of the process P4, the members 22 and 23 are inserted into the core 6 to restrain the inner circumferential portion 6b of the core 6 from being moved and to align and reshape the inner circumferential portions and teeth 12 of the sheets 11.

At step S4 of the process P4, the member 24 is moved down to perform the ironing for the thinned end portions 11a of the sheets 11 and to set back ends of the thinned end portions 11a protruded from the members 21 and 25. During this ironing performed by the member 24, the members 21 and 25 prevent the thinned end portions 11a of the sheets 11 from being moved or bent toward the axial direction, and the thinned end portions 11a of the sheets 11 are slightly protruded from the members 21 and 25 toward the outer side. Therefore, when the chamfered portion 29 of the member 24 collides with each thinned end portion 11a fixed by the members 21 and 25 and slightly protruded from the members 21 and 25, the component force (see arrows in FIG. 6) directed in the radial direction is produced from the ironing load of the member 24 as a pushing force. This pushing force is uniformly added to the whole thinned end portion 11a along the circumferential direction. In this case, the plastic deformation directed in the radial direction is heightened so as to uniformly and reliably set back the protruded end of the thinned end portion 11a along the circumferential direction. Therefore, the member 24 adequately performs the ironing for the thinned end portions 11a of the sheets 11. Accordingly, the outer side surface of each sheet 11 can be smoothly formed along the circumferential direction, and the outer diameter of each sheet 11 can be precisely set at the predetermined value.

Further, in response to the component force based on the ironing load of the member 24, another component force directed in the radial direction is produced from the ironing load of each of the members 22 and 23 as a pushing force. The pushing force from the member 22 is equally given to the inner circumferential portions of the sheets 11 (see arrows in FIG. 6) and is uniformly distributed along the circumferential direction. The pushing force from the member 23 is equally given to the teeth 12 of the sheets 11 (see arrows in FIG. 6) and is uniformly distributed along the circumferential direction.

Then, at step S5, the members 22, 23 and 24 are moved down, and the member 25 is moved up. Then, the core 6 is knocked and taken out from the member 21. Therefore, the ironing for the thinned end portions 11*a* of the core 6 is completed, and the core 6 is obtained as the stator core 3.

Accordingly, when the members 22 and 23 are detached from the core 6, the inner side surface of each sheet 11 can be smoothly formed along the circumferential direction, and the inner diameter of each sheet 11 can be precisely set at the predetermined value. Further, the inner surface of each slot 14 can be smoothly formed, and the slot 14 can be formed at the predetermined shape.

As a result, the stator core 3 can have the circularity at each of the outer and inner diameters, the concentricity between the inner and outer end portions of the core 3, and the perpendicularity of each sheet 11 to the axial direction of the core 3. Further, the stator core 3 can have the sheets 11 having smoothed inner and outer side surfaces.

As described above, in the method of manufacturing the stator core 3, the protrusions 31 and 32 of the members 21 and 25 lead the core 6 to coaxially place the core 6 with the members 21 and 25, the members 21 and 25 fixing the core 6 bring the thinned end portions 11*a* of the core 6 into contact with one another to heighten the rigidity or mechanical strength of the core 6 in the axial direction and to prevent the thinned end portions 11*a* from being moved or bent in the axial direction in response to an ironing load, and the members 21 and 25 fixing the core 6 cause the thinned end portions 11*a* of the core 6 to protrude from the members 21 and 25 toward the outer side by an appropriate margin of the ironing.

Accordingly, the thinned end portion 11*a* of each sheet 11 can receive the radial-directional ironing load from the member 24, the ironing load can be uniformly distributed along the circumferential direction, and the inner and outer side surfaces of the core 6 can be smoothly formed at the predetermined size. That is, the ironing can be performed for the sheets 11 of the core 6 to manufacture the stator core 3 with high precision.

Effects in the manufacturing method according to this embodiment will be described.

In this method, the steel plate 13 with the magnetic pole teeth 12 is helically wound while a side portion of the steel plate 13 is thinned to form the cylindrical laminated core 6. This laminated core 6 has the steel sheets 11 aligned along the axial direction of the core 6, and the sheets 11 have the teeth 12 on the inner side of the core 6 and have respective thinned end portions 11*a* spaced apart from one another on the outer side of the core 6. Then, the ironing for the thinned end portions 11*a* of the sheets 11 is performed to form the stator core 3 from the laminated core 6. In this ironing, the thinned end portions 11*a* of the sheets 11 are brought into contact with one another, and the ironing load is given to the thinned end portions 11*a* to shorten lengths of the thinned end portions 11*a* in the radial direction at a predetermined value.

Because the thinned end portions 11*a* of the sheets 11 are brought into contact with one another, each thinned end portion 11*a* heightens the resistance to the ironing load directed in the axial direction and is hardly deformed, bent or buckled toward the axial direction. Therefore, when the ironing load is given to each thinned end portion 11*a*, plastic deformation directed in the radial direction is easily caused in the thinned end portion 11*a*. This plastic deformation is uniformly distributed along the circumferential direction of the laminated core 6. Therefore, in response to the ironing load, each thinned end portion 11*a* can be uniformly set back along the circumferential direction.

Accordingly, when each thinned end portion 11*a* is set back along the circumferential direction in response to the ironing load, the length of the thinned end portion 11*a* in the radial direction can be uniformly shortened along the circumferential direction, the length of the thinned end portion 11*a* can be uniformly shortened along the circumferential direction, and the lengths of the thinned end portions 11*a* can be precisely shortened at the predetermined value. That is, the outer diameter of the stator core 3 can be precisely adjusted. Further, because each thinned end portion 11*a* heightens the resistance to the ironing load directed in the axial direction, this method can prevent any inter-sheet opening from being formed between the thinned end portions 11*a*.

Further, to bring the thinned end portions 11*a* into contact with one another, the forming apparatus 20 is used. This apparatus 20 has the cylindrical work receiving member 21 and the cylindrical work pressing member 25 substantially coaxially disposed with each other. The protrusion 31 or 32 protruding along the axial direction is formed on at least one of the surfaces 27 and 28 of the members 21 and 25 facing each other. Then, the laminated core 6 is placed between the surfaces 27 and 28 of the members 21 and 25 so as to substantially coaxially dispose the core 6 with the members 21 and 25, the member 25 presses the thinned end portions 11*a* of the steel sheets 11 on the member 21, and the protrusion 31 or 32 deforms the thinned end portions 11*a* along the axial direction such that the thinned end portions 11*a* are brought into contact with one another.

Because the protrusion 31 or 32 protrudes along the axial direction, the thinned end portions 11*a* deformed along the shape of the protrusion 31 or 32 are brought into contact with one another. Further, the protrusion 31 or 32 leads the core 6 to coaxially place the core 6 with the member 21 or 25.

Accordingly, the stator core 3 can be manufactured by using the forming apparatus 20 having the simple configuration. Further, because the protrusion 31 or 32 coaxially disposes the core 6 with the members 21 and 25, the period of time required to perform the ironing for the thinned end portions 11*a* of the core 6 can be shortened.

Moreover, when the protrusions 31 and 32 are formed on the respective surfaces 27 and 28 of the members 21 and 25, the sum of protruding lengths of the protrusions 31 and 32 along the axial direction is set to be substantially equal to the sum of axial widths of spaces opened along the axial direction among the thinned end portions 11*a*.

Accordingly, the thinned end portions 11*a* can be reliably brought into contact with one another, so that the ironing can be easily performed for the thinned end portions 11*a* of the core 6. Further, the protruding length of each protrusion is changeable. Therefore, the protruding lengths of the protrusions 31 and 32 can be set to stably perform the ironing, and the freedom of design for the forming apparatus 20 can be heightened.

Alternatively, when the protrusion is formed on one of the surfaces 27 and 28 of the members 21 and 25, the protruding length of the protrusion along the axial direction is set to be substantially equal to the sum of axial widths of spaces opened along the axial direction among the thinned end portions 11*a*. Accordingly, the thinned end portions 11*a* can be reliably brought into contact with one another, so that the ironing can be easily performed for the thinned end portions 11a of the core 6.

Still further, to give the ironing load to the thinned end portions 11a, the cylindrical ironing member 24 is prepared. This member 24 has the inner diameter smaller than the outer diameter of the laminated core 6 and has the chamfered portion 29 on the inner side of its end surface such that the chamfered portion 29 makes an acute angle with the radial direction. Then, the core 6 is placed coaxially with the ironing member 24, and the ironing member 24 is moved along the axial direction such that the chamfered portion 29 collides or comes in contact with the thinned end portion 11a of each steel sheet 11 and shortens the length of the thinned end portion 11a at the predetermined value.

Therefore, because the chamfered portion 29 makes an acute angle with each thinned end portion 11a extending along the radial direction, the chamfered portion 29 produces a component force directed in the radial direction from the ironing load as a pushing force. This pushing force is given to each thinned end portion 11a. The pushing force heightens the plastic deformation caused in the thinned end portion 11a. This plastic deformation is directed in the radial direction.

Accordingly, the plastic deformation can be easily caused in the thinned end portions 11a, and the thinned end portions 11a can be reliably set back to shorten the length of the thinned end portions 11a in the radial direction. That is, the ironing for the thinned end portions 11a can be adequately performed.

Figure 7:
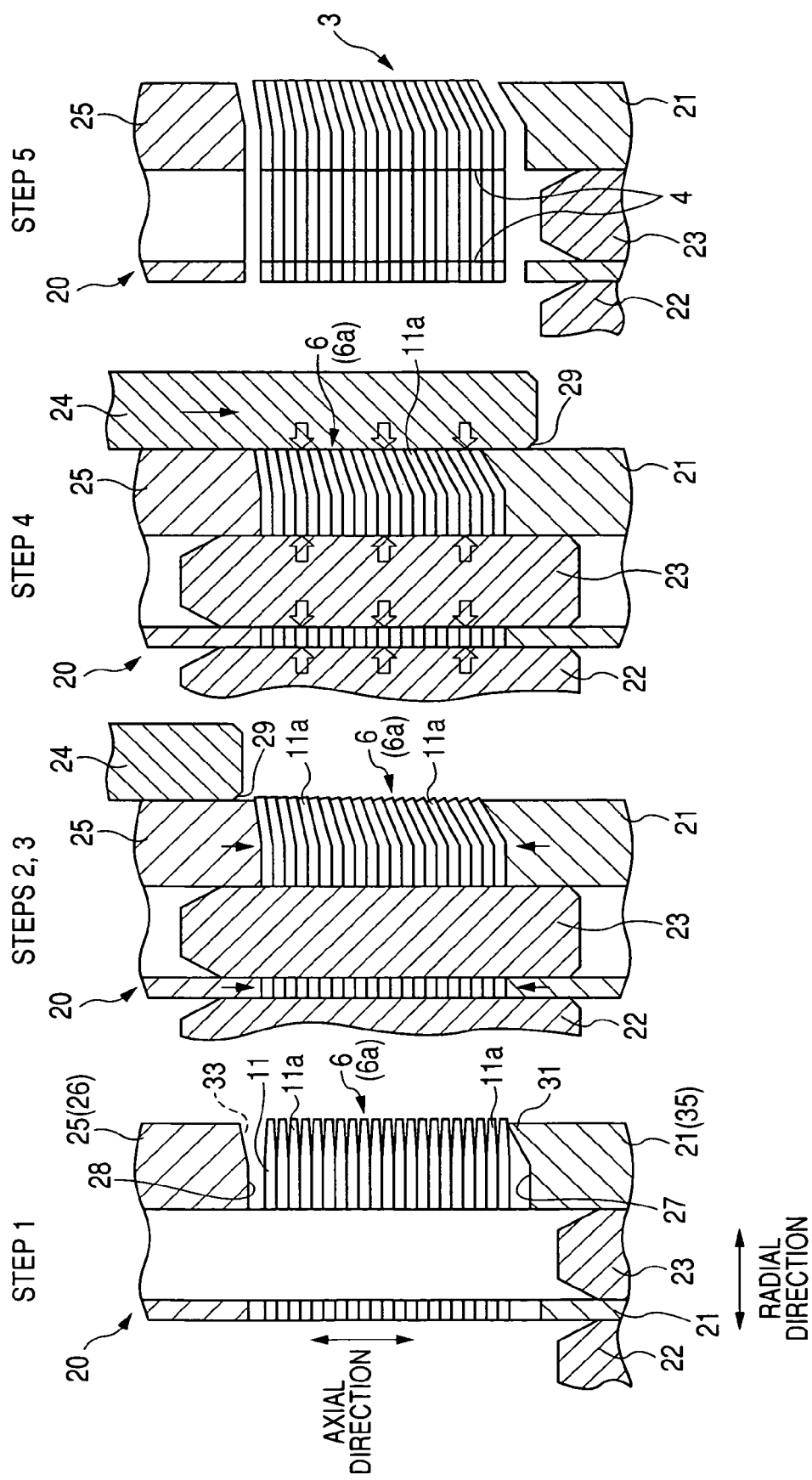
FIG. 7 shows enlarged sectional views of the peripheral portion of the laminated core at steps of the finishing process according to a modification of the first embodiment.

A modification of the first embodiment will be described with reference to FIG. 7. FIG. 7 shows enlarged sectional views of the peripheral portion 6a of the core 6 at steps of the finishing process P4.

As shown in FIG. 7, the member 21 has the protrusion 31 of which the depth (i.e., protruding length) in the axial direction is larger than that of the protrusion 31 shown in FIG. 6. The member 25 has a depression 33 placed on the outer area of the lower end surface 28. The depression 33 is depressed on the surface 28 in the axial direction so as to be away from the member 21. The depression 33 is formed in a tapered shape in section such that the depth of the depression 33 in the axial direction is gradually increased toward the outer side of the member 25.

The depth of the protrusion 31 is larger than the depth of the depression 33, and the difference between the depths in the axial direction is substantially equal to the sum of axial widths of spaces opened along the axial direction among the thinned end portions 11a.

With this structure of the apparatus 20, at step 2, when the member 25 presses the core 6 on the member 21, the thinned end portions 11a of the core 6 are deformed or bent toward the member 25 along the shapes of the protrusion 31 and the depression 33. Therefore, the protrusion 31 and the depression 33 cause the thinned end portions 11a spaced apart from one another through the opened spaces to be brought into contact with one another along the axial direction.

The members 21 and 25 restrain the thinned end portions 11a from being moved along the axial direction. Therefore, plastic deformation directed in the radial direction can be easily caused in the thinned end portions 11a. Further, because the protrusion 31 protrudes toward the member 25 while the depression 33 is depressed so as to be away from the member 21, the thinned end portions 11a of the sheets 11 are uniformly bent toward the depression 33 along the axial direction. This bending of the thinned end portions 11a directed toward the depression 33 produces an angle of incidence at which each thinned end portion 11a collides or comes in contact with the member 24 to receive the ironing load of the member 24.

Therefore, at step S4, when the member 24 is moved down to perform the ironing for the thinned end portions 11a, the chamfered portion 29 of the member 24 can produce the component force directed in the radial direction from the ironing load of the member 24 as a pushing force. This pushing force is given to each thinned end portion 11a so as to push the thinned end portion 11a toward the outer side at a higher strength. The thinned end portions 11a arranged along the axial direction can equally receive this pushing force (see arrows in FIG. 7). Accordingly, the plastic deformation directed in the radial direction can be easily caused in the thinned end-portions 11a.

Further, in response to the pushing force derived from the ironing load of the member 24, another component force directed in the radial direction is produced from the ironing load of each of the members 22 and 23 as a pushing force. The pushing force (see arrows in FIG. 7) from the member 22 is equally given to the inner circumferential portions of the sheets 11 and is uniformly distributed along the circumferential direction. The pushing force (see arrows in FIG. 7) from the member 23 is equally given to the teeth 12 of the sheets 11 and is uniformly distributed along the circumferential direction.

Accordingly, when the members 22 and 23 are detached from the core 6 at step 5 of the process P4, the inner side surface of each sheet 11 can be smoothly formed along the circumferential direction, and the inner diameter of each sheet 11 can be precisely set at the predetermined value. Further, the inner surface of each slot 14 can be smoothly formed, and the slot 14 can be formed at the predetermined shape.

As a result, the stator core 3 can have the circularity at each of the outer and inner diameters, the concentricity between the inner and outer end portions of the core 3, and the perpendicularity of each sheet 11 to the axial direction of the core 3. Further, the stator core 3 can have the sheets 11 having smoothed inner and outer side surfaces without having any inter-sheet opening.

Embodiment 2

In the first embodiment, as shown in FIG. 6, when the member 25 presses the core 6 on the member 21, the outer end portions of the core 6 are bent along the shapes of the protrusions 31 and 32. In this case, the outer end portions placed at the axial ends of the core 6 are largely bent, but the outer end portions placed in the center of the core 6 are slightly bent. Therefore, when the core 6 is manufactured so as to have the sheets 11 approximately set at the same outer diameter, the margin for ironing (i.e., length of the outer end portion protruded from the members 21 and 25 in the radial direction) is large in the center of the core 6 but is small at the axial ends of the core 6. To uniformly and reliably shorten the outer end portions at a predetermined value, the core 6 is manufactured such that the margin for ironing is appropriately large at any position of the core 6 in the axial direction.

In contrast, in the second embodiment, the ironing member 24 is modified. Even when the margin for ironing is not sufficient at any position of the core 6 in the axial direction, this modified member adequately performs the ironing for the thinned end portions 11a of the core 6 to form the stator core 3 from the laminated core 6 with high accuracy.

Figure 8:
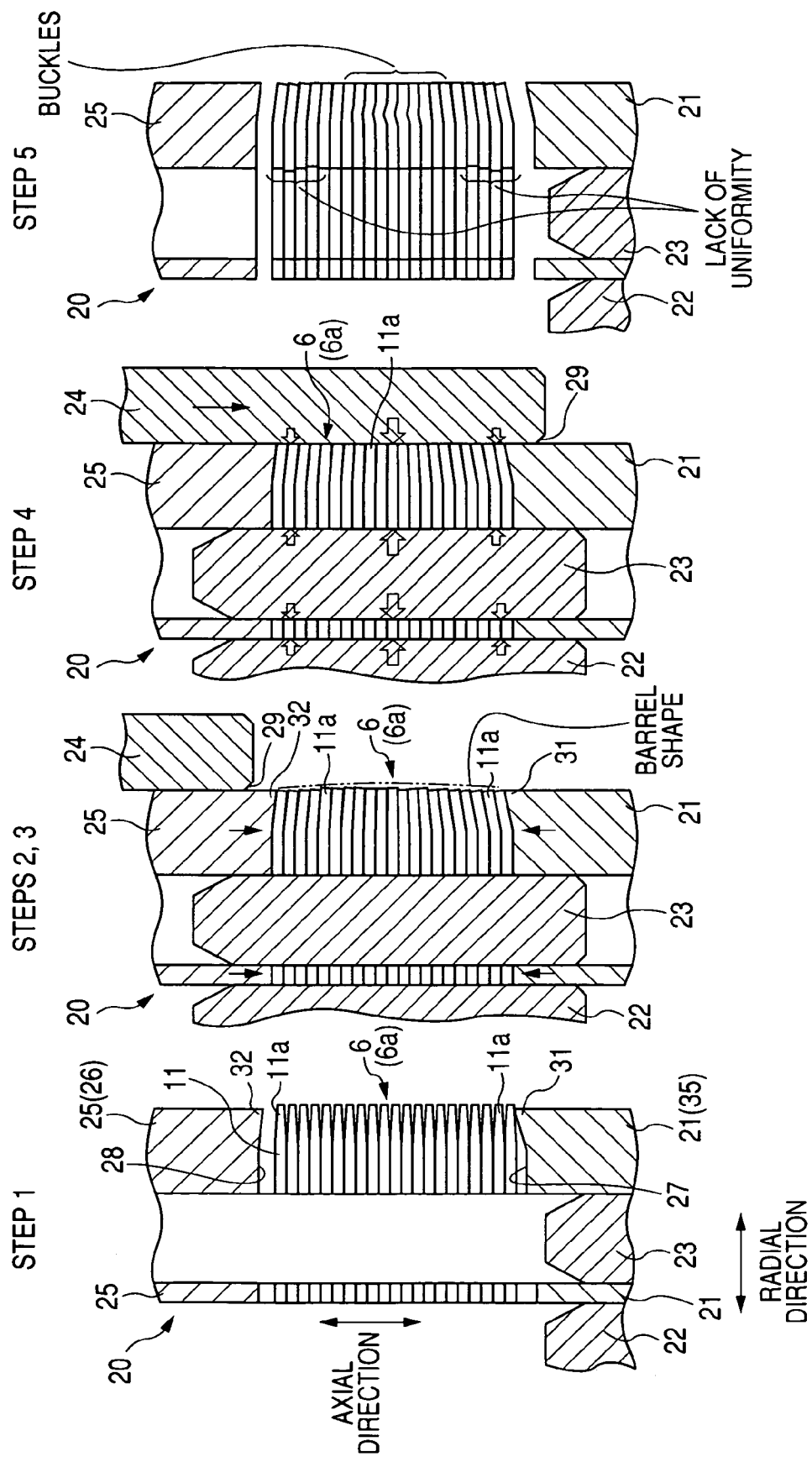
FIG. 8 shows enlarged sectional views of the peripheral portion of the laminated core at steps of the finishing process when the margin for ironing is insufficient.

First, the ironing according to the first embodiment in case of an insufficient margin for ironing will be described with reference to FIG. 8 to clarify problems caused in the ironing. FIG. 8 shows enlarged sectional views of the peripheral portion 6a of the core 6 at steps of the finishing process P4 when the margin for ironing is insufficient.

As shown in FIG. 8, at step 2 of the process P4, when the member 25 presses the core 6 on the member 21, the thinned end portions 11a of the core 6 are brought into contact with one another. In this case, because each thinned end portion 11a placed at the upper half of the core 6 is bent by the sum of axial distances of opened spaces formed between this thinned end portion 11a and the thinned end portion 11a placed in the center of the core 6, the bending level of the thinned end portion 11a is increased along the upper direction approaching the member 25. Therefore, the upper half of the core 6 is formed in a taper shape, the radial length of the thinned end portion 11a at the upper radial end of the core 6 is minimized, and the radial length of the thinned end portion 11a in the center of the core 6 is maximized.

In the same manner, because each thinned end portion 11a placed at the lower half of the core 6 is bent by the sum of axial distances of opened spaces formed between this thinned end portion 11a and the thinned end portion 11a placed in the center of the core 6, the bending level of the thinned end portion 11a is increased along the lower direction approaching the member 21. Therefore, the lower half of the core 6 is formed in a taper shape, the radial length of the thinned end portion 11a at the lower radial end of the core 6 is minimized, and the radial length of the thinned end portion 11a in the center of the core 6 is maximized. As a result, the core 6 is deformed in a barrel shape.

In the barrel-shaped core 6, the margin for ironing is maximized in the center of the core 6 and is minimized at the axial ends of the core 6. As the depth of one protrusion 31 or 32 in the axial direction is enlarged, the difference in the margin is increased. In contrast, as the depth of each protrusion is reduced, the difference in the margin is decreased.

At step 4, when the member 24 starts moving down toward the thinned end portions 11a of the core 6, the chamfered portion 29 of the member 24 first collides or comes in contact with the thinned end portions 11a placed around one axial end of the core 6, and the ironing is performed for the thinned end portions 11a having the insufficient margin for ironing. In this ironing, because the margin for ironing is insufficient, the pushing force derived from the ironing load of the member 24 and directed in the radial direction is insufficiently given to each thinned end portion 11a (see small arrow in FIG. 8). Therefore, the plastic deformation caused in the thinned end portion 11a by the pushing force is insufficient, so that the ironing is insufficiently performed.

Then, when the member 24 is further moved down, the chamfered portion 29 of the member 24 collides with the thinned end portions 11a placed around the center of the core 6, and the ironing is performed for the thinned end portions 11a having the sufficient margin for ironing. In this ironing, because the margin for ironing is sufficient, the pushing force is sufficiently given to each thinned end portion 11a (see large arrow in FIG. 8). Therefore, the plastic deformation caused in the thinned end portion 11a by the pushing force is sufficient, so that the ironing is adequately performed.

Then, when the member 24 is further moved down, the chamfered portion 29 of the member 24 collides with the thinned end portions 11a placed around the other axial end of the core 6, and the ironing is performed for the thinned end portions 11a having the insufficient margin for ironing. Therefore, the pushing force is insufficiently given to each thinned end portion 11a (see small arrow in FIG. 8), and the ironing is insufficiently performed for the thinned end portions 11a.

Accordingly, when the core 6 pressed by the member 25 is deformed in a barrel shape so as to have an insufficient margin for ironing around one axial end of the core 6, there is a probability that the outer diameters of the thinned end portions 11a cannot be equally set or the outer diameter of one thinned end portion 11a placed near the axial end of the core 6 cannot be uniformly set along the circumferential direction (see step 5 in FIG. 8).

In contrast, when the core 6 is manufactured in a larger size in the radial direction to avoid the insufficient margin for ironing, the core 6 deformed in a barrel shape has a sufficient margin for ironing around each axial end of the core 6. Therefore, the ironing for the thinned end portions 11a around each axial end of the core 6 can be adequately performed. However, the margin for ironing around the center of the core 6 sometimes becomes too large. In this case, when it is intended to perform the ironing for one thinned end portion 11a around the center of the core 6, the thinned end portion 11a is easily deformed, bent or buckled toward the axial direction (see step 5 in FIG. 8). Therefore, the ironing for the thinned end portions 11a around the center of the core 6 cannot be adequately performed.

Figure 9:
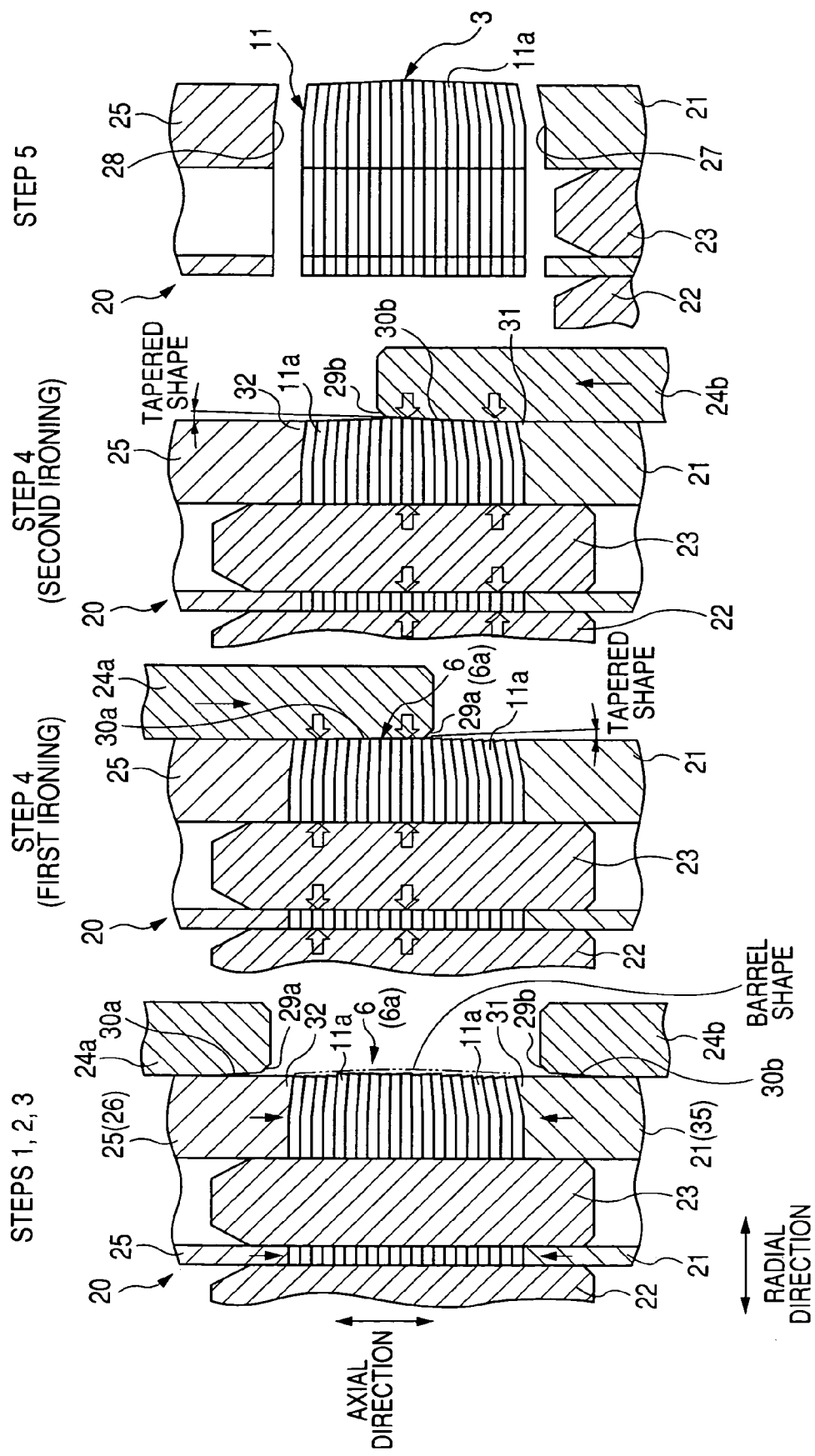
FIG. 9 shows enlarged sectional views of the peripheral portion of the laminated core at steps of the finishing process according to the second embodiment.

FIG. 9 shows enlarged sectional views of the peripheral portion 6a of the core 6 at steps of the finishing process P4 according to the second embodiment.

As shown in FIG. 9, at step 2, when the member 25 presses the core 6 on the member 21, the thinned end portions 11a of the core 6 are brought into contact with one another, and the core 6 is deformed in a barrel shape. That is, the margin for ironing is large in the center of the core 6 while being small at the axial ends of the core 6.

At step 4, the forming apparatus 20 performs the ironing for the thinned end portions 11a of the sheets 11. As shown in FIG. 9, the apparatus 20 has an upper cylindrical ring member 24a slidable on the member 25 and a lower cylindrical ring member 24b slidable on the member 21. The members 24a and 25 are coaxially disposed. The members 21 and 24b are coaxially disposed. The member 24a has a chamfered portion 29a at its lower end facing the member 25 and an inclined inner surface (i.e., ironing surface) 30a at the lower portion thereof. The surface 30a is spaced apart from the member 25 so as to form a tapered space between the member 25 and the surface 30a. This tapered space is narrowed toward the upper direction away from the core 6 while being widely opened at the lower end of the member 24a. The member 24b has a chamfered portion 29b at its upper end facing the member 21 and an inclined inner surface (i.e., ironing surface) 30b at the upper portion thereof. The surface 30b is spaced apart from the member 21 so as to form a tapered space between the member 21 and the surface 30b. This tapered space is narrowed toward the lower direction away from the core 6 while being widely opened at the upper end of the member 24b.

The inclination of the surface 30a of the member 24a with respect to the axial direction (i.e., the center axis of the member 24a) is set to be substantially the same as the inclination of the radial end of the peripheral portion 6a on the upper half of the barrel-shaped core 6. Therefore, the ironing margin of the thinned end portions 11a becomes substantially constant along the inclination direction of the surface 30a. In the same manner, the inclination of the surface 30b of the member 24b with respect to the axial direction is set to be substantially the same as the inclination of the radial end of the peripheral portion 6a on the lower half of the core 6. Therefore, the ironing margin of the thinned end portions 11a becomes substantially constant along the inclination direction of the surface 30b.

To perform the ironing for the thinned end portions 11a of the sheets 11 disposed on the upper half of the core 6, the member 24a is moved down. More specifically, the member 24a does not perform the ironing for the thinned end portions 11a of the core 6 until the chamfered portion 29a of the member 24a approaches the center of the core 6. When the member 24a approaches the center of the core 6, the member 24a starts performing the ironing for the thinned end portions 11a of the sheets 11 disposed on the upper half of the core 6. That is, the surface 30a of the member 24a collides or comes in contact with the thinned end portions 11a, and the pushing force derived from the ironing load of the member 24a and directed in the radial direction causes the plastic deformation in the thinned end portions 11a. When the member 24a reaches the center of the core 6, the inclination of the radial end of the barrel-shaped core 6 is approximately equal to the inclination of the surface 30a of the member 24a, and the member 24a uniformly performs the ironing for the thinned end portions 11a. Then, the member 24a is moved up, so that the first ironing for the thinned end portions 11a of the sheets 11 disposed on the upper half of the core 6 is completed.

Then, the member 24b is moved up to perform the ironing for the thinned end portions 11a of the sheets 11 disposed on the lower half of the core 6. More specifically, the member 24b does not perform the ironing for the thinned end portions 11a of the core 6 until the chamfered portion 29b of the member 24b approaches the center of the core 6. When the member 24b approaches the center of the core 6, the member 24b starts performing the ironing for the thinned end portions 11a of the sheets 11 disposed on the lower half of the core 6. That is, the surface 30b of the member 24b collides with the thinned end portions 11a, and the pushing force derived from the ironing load of the member 24b and directed in the radial direction causes the plastic deformation in the thinned end portions 11a. When the member 24b reaches the center of the core 6, the inclination of the radial end of the barrel-shaped core 6 is approximately equal to the inclination of the surface 30b of the member 24b, and the member 24b uniformly performs the ironing for the thinned end portions 11a. Therefore, the second ironing for the thinned end portions 11a of the sheets 11 disposed on the lower half of the core 6 is completed.

Then, the members 22, 23 and 24b are moved down, and the member 25 is moved up. Then, the core 6 is knocked and taken out from the member 21. Therefore, the ironing for the thinned end portions 11a of the core 6 is completed, and the core 6 is obtained as the stator core 3.

In this embodiment, the first ironing for the upper half of the core 6 and the second ironing for the lower half of the core 6 are sequentially and successively performed. However, these ironings may be simultaneously performed, or these ironings may be intermittently performed.

Further, in this embodiment, because the depths of the protrusions 31 and 32 are the same, the center of the core 6 in the axial direction has the maximum width along the radial direction. Therefore, the core 6 is equally partitioned into two at its center, and the ironing is performed for each half of the core 6. However, because the axial position of the core 6 having the maximum width depends on the relationship between the depths of the protrusions 31 and 32, the member 24a may perform the ironing for one of two portions of the core 6 partitioned at its axial position corresponding to the maximum width while the member 24b performs the ironing for the other portion of the core 6. For example, the member 24a may perform the ironing for the two-thirds portion of the core 6 while the member 24b performs the ironing for the one-third portion of the core 6.

Moreover, when the member 25 has the depression 33, the radial end of the core 6 pressed between the members 21 and 25 is inclined with respect to the center axis of the core 6 so as to form the core 6 in a tapered shape. That is, the thinned end portion 11a disposed on one axial end of the core 6 has the maximum margin for the ironing, while the thinned end portion 11a disposed on the other axial end of the core 6 has the minimum margin for the ironing (see FIG. 7). In this case, the ironing for the thinned end portions 11a of the core 6 is performed only by one of the members 24a and 24b.

As described above, in this manufacturing method, because at least one of the ironing surfaces 30a and 30b is formed on the ring member 24a or 24b such that the inclination of the ironing surface with respect to the axial direction is substantially the same as the inclination of the radial end of the core 6 deformed in a barrel shape or in a tapered shape, the ironing margin of the thinned end portions 11a becomes substantially constant along the inclination direction of the surface 30a.

Accordingly, even when the core 6 pressed between the members 21 and 25 is deformed in a barrel shape or in a tapered shape, the margin for the ironing can be appropriately set at any position of the core 6 in the axial direction, and the ironing can be uniformly and adequately performed for the thinned end portions 11a of the core 6. Therefore, the stator core 3 can be obtained without forming any inter-sheet opening between the thinned end portions 11a.

Further, because the margin for the ironing can be appropriately set, the margin can be set so as to reduce the ironing load. Accordingly, the driving power required for the ironing can be reduced, the forming apparatus 20 can be simplified, and the manufacturing cost of the stator core 3 can be lowered.

Moreover, when the depths of the protrusions 31 and 32 are equal to each other, the difference in the outer diameter among the thinned end portions 11a of the core 6 can be minimized, and the margin for the ironing required to appropriately perform the ironing can be minimized. In this case, because the outer diameters of the thinned end portions 11a at the axial ends of the core 6 are approximately the same, the outer diameters of the stator core 3 at its axial ends can be easily set to be substantially the same. Accordingly, when the stator core 3 placed between the frames 9f and 9r and fastened by bolts is assembled into the alternator 1 (see FIG. 2), the axial end surfaces of the stator core 3 can be precisely positioned on the frames, and the stator core 3 can be stably fixed to the frames. That is, the center axis of the stator core 3 can be easily set to be parallel to the extending direction of each bolt, and the bolts can stably fasten the stator core 3 to the frames for a long time.

A manufacturing method according to a modification of the second embodiment will be described with reference to FIG. 10. FIG. 10 shows enlarged sectional views of the peripheral portion 6a of the core 6 at steps of the finishing process P4 according to a modification of the second embodiment.

In the second embodiment, because each of the members 21 and 25 has the protrusion 31 or 32, the core 6 pressed between the members 21 and 25 is deformed in a barrel shape. In contrast, in this modification, as shown in FIG. 10, although the member 25 has the protrusion 32, the member 21 has a flat surface 27 on its upper end without having any protrusion.

As shown in FIG. 10, at step 2, when the member 25 presses the core 6 on the member 21, the thinned end portions 11a of the core 6 are brought into contact with one another. In this case, all thinned end portions 11a of the core 6 are deformed or bent toward the member 21 by the protrusion 32. Because each thinned end portion 11a is bent by the sum of axial distances of opened spaces formed between this thinned end portion 11a and the thinned end portion 11a placed at the lower axial end of the core 6, the bending level of the thinned end portion 11a is increased along the upper direction approaching the member 25. That is, the radial length of the thinned end portion 11a bent by the protrusion 32 is shortened along the upper direction. Therefore, the core 6 is deformed in a tapered shape so as to be tapered toward the upper direction.

In this taper-shaped core 6, the margin for ironing is minimized at the thinned end portion 11a being in contact with the member 25, and the margin for ironing is maximized at the thinned end portion 11a being in contact with the member 21. As the thinning level of the outer end portions of the core 6 is heightened (i.e., as the depth of the protrusion 32 in the axial direction is enlarged), the difference in the margin is increased. In contrast, as the thinning level of the outer end portions of the core 6 is lowered, the difference in the margin is decreased.

At step 4, the member 24 is moved down to perform the ironing for all thinned end portions 11a of the core 6. The member 24 has an inclined inner surface 30c at the lower portion thereof. The surface 30c is spaced from the member 25 so as to form a tapered space between the member 25 and the surface 30c. This tapered space is narrowed toward the upper direction away from the core 6 while being widely opened at the chamfered portion 29 placed at the lower axial end of the member 24. The inclination of the surface 30c of the member 24 with respect to the axial direction (i.e., center axis of the member 24) is substantially the same as the inclination of the radial end of the taper-shaped core 6. Therefore, the ironing margin of the thinned end portions 11a becomes substantially constant along the inclination direction of the surface 30c.

When the member 24 starts moving down, the chamfered portion 29 of the member 24 passes over the outer end of the core 6 from the upper axial end of the core 6, at which the outer diameter of the taper-shaped core 6 is minimized, to the lower axial end of the core 6 at which the outer diameter of the taper-shaped core 6 is maximized. Therefore, the member 24 does not perform the ironing for the thinned end portions 11a of the core 6 until the chamfered portion 29 of the member 24 approaches the lower axial end of the core 6. When the member 24 approaches the lower axial end of the core 6, the member 24 starts performing the ironing for all thinned end portions 11a of the core 6. That is, the surface 30c of the member 24 collides with all thinned end portions 11a, and the pushing force (see white arrows in FIG. 10) derived from the ironing load of the member 24 and directed in the radial direction causes the plastic deformation in the thinned end portions 11a. When the member 24 reaches the axial lower end of the core 6, the inclination of the radial end of the taper-shaped core 6 is approximately equal to the inclination of the surface 30c of the member 24, and the member 24 uniformly performs the ironing for the thinned end portions 11a. Then, the member 24 is moved up, so that the ironing for all thinned end portions 11a of the core 6 is completed.

Further, a pushing force of the member 22 is equally given to the inner circumferential portions of the sheets 11 (see arrows in FIG. 10) and is uniformly distributed along the circumferential direction. A pushing force of the member 23 is equally given to the teeth 12 of the sheets 11 (see arrows in FIG. 10) and is uniformly distributed along the circumferential direction.

Then, the members 22 and 23 are moved down, and the member 25 is moved up. Then, the core 6 is knocked and taken out from the member 21. Therefore, the ironing for the thinned end portions 11a of the core 6 is completed, and the stator core 3 is formed from the core 6.

In this modification, the upper end surface 27 of the member 21 is flattened. However, the member 21 may have the protrusion 31, while the member 25 has a flat surface 28 on its lower end without having any protrusion. In this case, the core 6 is deformed in a tapered shape so as to be tapered toward the lower direction, and an ironing member having an inclined inner surface at the upper portion thereof is moved up and performs the ironing for all thinned end portions 11a of the core 6.

Therefore, even when the thinned end portions 11a of the core 6 are brought into contact with one another such that the core 6 is deformed in a taper shape, the margin for ironing can become constant along the inclination direction of the surface 30c of the member 24, and the plastic deformation directed in the radial direction can be uniformly given to the thinned end portions 11a. Accordingly, the ironing can be uniformly performed for the thinned end portions 11a.

These embodiments should not be construed as limiting the present invention to structures of those embodiments, and the structure of this invention may be combined with that based on the prior art. For example, in these embodiments, the method of manufacturing the stator core 3 is applied for the alternator 1 representing an electric rotating machine. However, this method may be applied for an electric rotating machine such as a motor driven in response to a current of a high voltage.

What is claimed is:

1. A method of manufacturing a stator core of an electric rotating machine, comprising the steps of:

helically winding a steel plate with a plurality of magnetic pole teeth while thinning a side portion of the steel plate to form a cylindrical laminated core which has a plurality of steel sheets aligned along an axial direction of the laminated core such that the steel sheets have the magnetic pole teeth on an inner side of the laminated core and have respective thinned outer end portions spaced apart from one another on an outer side of the laminated core; and performing ironing for the thinned outer end portions of the steel sheets to form the stator core from the laminated core, wherein the step of performing the ironing includes:

preparing a forming apparatus with a cylindrical work receiving member and a cylindrical work pressing member substantially coaxially disposed with each other so as to form a protrusion on at least one of contact surfaces of the members facing each other such that the protrusion protrudes along the axial direction;

placing the laminated core between the contact surfaces of the work receiving member and the work pressing member so as to substantially coaxially dispose the laminated core with the work receiving member and the work pressing member;

causing the work pressing member to press the thinned outer end portions of the steel sheets on the work receiving member and to deform the thinned outer end portions along a shape of the protrusion such that the thinned outer end portions are brought into contact with one another; and giving an ironing load to the thinned outer end portions, after bringing the thinned outer end portions of the steel sheets into contact with one another, to shorten lengths of the thinned outer end portions in a radial direction of the laminated core at a predetermined value.

2. The method according to claim 1, wherein the step of preparing the forming apparatus includes:
   forming the protrusion on one of the contact surfaces of the members; and
   setting a protruding length of the protrusion along the axial direction such that the protruding length is substantially equal to a sum of axial widths of spaces opened along the axial direction among the thinned outer end portions.

3. The method according to claim 1, wherein the step of preparing the forming apparatus includes:
   forming the protrusion on each of the contact surfaces of the members; and
   setting a sum of protruding lengths of the protrusions along the axial direction such that the sum of the protruding lengths is substantially equal to a sum of axial widths of spaces opened along the axial direction among the thinned outer end portions.

4. The method according to claim 1, further comprising the step of partially fixing the thinned outer end portions of the steel sheets of the laminated core to one another, the ironing step being executed for the thinned outer end portions partially fixed.

5. The method according to claim 1, wherein the step of giving the ironing load includes:
   taking out the thinned outer end portions of the laminated core shortened at the predetermined value from the forming apparatus while restoring one thinned outer end portion partially bended in the axial direction to a thinned outer end portion flattened in the axial direction.

6. The method according to claim 1, wherein the step of bringing the thinned outer end portions includes:
   causing a forming apparatus to restrain the thinned outer end portions of the laminated core from being moved and to bend each thinned outer end portion in the axial direction, and
   the step of giving the ironing load includes:
   taking out the thinned outer end portions of the laminated core shortened at the predetermined value from the forming apparatus while uniformly maintaining the bending of each thinned outer end portion along a circumferential direction of the laminated core.

7. The method according to claim 1, wherein the step of bringing the thinned outer end portions includes:
   bringing all the thinned outer end portions of the steel sheets into contact with one another, and
   the step of giving the ironing load includes:
   giving the ironing load to all the thinned outer end portions brought into contact with one another.

8. The method according to claim 1, wherein the step of bringing the thinned outer end portions includes:
   bringing all the thinned outer end portions of the steel sheets into direct contact with one another, and
   the step of giving the ironing load includes:
   giving the ironing load to all the thinned outer end portions brought into direct contact with one another.

9. The method according to claim 1, wherein the step of bringing the thinned outer end portions includes:
   bringing the thinned outer end portions of the steel sheets into direct contact with one another.

10. A method of manufacturing a stator core of an electric rotating machine, comprising the steps of:
    helically winding a steel plate with a plurality of magnetic pole teeth while thinning a side portion of the steel plate to form a cylindrical laminated core which has a plurality of steel sheets aligned along an axial direction of the laminated core such that the steel sheets have the magnetic pole teeth on an inner side of the laminated core and have respective thinned outer end portions spaced apart from one another on an outer side of the laminated core; and
    performing ironing for the thinned outer end portions of the steel sheets to form the stator core from the laminated core,
    wherein the step of performing the ironing includes:
    preparing a forming apparatus with a cylindrical work receiving member and a cylindrical work pressing member substantially coaxially disposed with each other so as to form a protrusion, protruding along the axial direction, on a contact surface of the work receiving member and to form a depression, depressed along the axial direction, on a contact surface of the work pressing member;
    placing the laminated core between the contact surfaces of the work receiving member and the work pressing member so as to substantially coaxially dispose the laminated core with the work receiving member and the work pressing member;
    causing the work pressing member to press the thinned outer end portions of the steel sheets on the work receiving member and to deform the thinned outer end portions along both a shape of the protrusion and a shape of the depression such that the thinned outer end portions are brought into contact with one another; and
    giving an ironing load to the thinned outer end portions, after bringing the thinned outer end portions of the steel sheets into contact with one another, to shorten lengths of the thinned outer end portions in a radial direction of the laminated core at a predetermined value.

11. The method according to claim 10, wherein the step of preparing the forming apparatus includes:
    setting both a protruding length of the protrusion along the axial direction and a depressing length of the depression along the axial direction such that the protruding length is larger than a sum of axial widths of spaces opened along the axial direction among the thinned outer end portions and such that the depressing length is substantially equal to a difference between the protruding length and the sum of the axial widths of the spaces.

12. A method of manufacturing a stator core of an electric rotating machine, comprising the steps of:
    helically winding a steel plate with a plurality of magnetic pole teeth while thinning a side portion of the steel plate to form a cylindrical laminated core which has a plurality of steel sheets aligned along an axial direction of the laminated core such that the steel sheets have the magnetic pole teeth on an inner side of the laminated core and have respective thinned outer end portions spaced apart from one another on an outer side of the laminated core; and
    performing ironing for the thinned outer end portions of the steel sheets to form the stator core from the laminated core,
    wherein the step of performing the ironing includes:
    deforming the laminated core in a taper shape while inclining an outer end of the laminated core with respect to the axial direction such that the thinned outer end portions of the steel sheets of the laminated core are brought into contact with one another;

preparing a cylindrical ironing member which has an inner diameter smaller than an outer diameter of the laminated core deformed in the taper shape and has an ironing surface inclined with respect to a center axis of the ironing member;

coaxially and separately placing the laminated core and the ironing member such that the inclination of the ironing surface is substantially the same as the inclination of the outer end of the laminated core deformed in the taper shape; and moving the ironing member along the axial direction such that the ironing surface of the ironing member comes in contact with the thinned outer end portions of the laminated core to give an ironing load of the ironing member to the thinned outer end portions, after bringing the thinned outer end portions of the steel sheets into contact with one another, and to shorten lengths of the thinned outer end portions in a radial direction of the laminated core at a predetermined value.

13. The method according to claim 12, wherein the step of deforming the laminated core includes:

deforming the laminated core such that an outer diameter of the laminated core is increased along a direction from a first axial end of the laminated core to a second axial end of the laminated core, the step of preparing the ironing member includes:

inclining the ironing surface such that a tapered space is formed on the ironing member to be widened on an axial end of the ironing member, and the step of moving the ironing member includes:

causing the ironing surface of the ironing member to pass from the first axial end of the laminated core to the second axial end of the laminated core.

14. The method according to claim 12, wherein the step of deforming the laminated core includes:

deforming the laminated core such that an outer diameter of the laminated core is increased along a direction from a first axial end of the laminated core to a middle of the laminated core and is decreased along a direction from the middle of the laminated core to a second axial end of the laminated core, the step of preparing the ironing member includes:

preparing a first cylindrical ironing member having a first ironing surface inclined with respect to a center axis thereof and a second cylindrical ironing member having a second ironing surface inclined with respect to a center axis thereof, and the step of moving the ironing member includes:

moving the first cylindrical ironing member along the axial direction such that the first ironing surface passes from the first axial end of the laminated core to the middle of the laminated core; and moving the second cylindrical ironing member along the axial direction such that the second ironing surface passes from the second axial end of the laminated core to the middle of the laminated core.

15. The method according to claim 14, wherein the step of moving the ironing member further includes:

alternately or simultaneously moving the first and second cylindrical ironing members.

16. The method according to claim 14, wherein a distance from the first axial end of the laminated core to the middle of the laminated core is set to be approximately equal to a distance from the second axial end of the laminated core to the middle of the laminated core.

17. A method of manufacturing a stator core of an electric rotating machine, comprising the steps of:

helically winding a steel plate with a plurality of magnetic pole teeth while thinning a side portion of the steel plate to form a cylindrical laminated core which has a plurality of steel sheets aligned along an axial direction of the laminated core such that the steel sheets have the magnetic pole teeth on an inner side of the laminated core and have respective thinned outer end portions spaced apart from one another on an outer side of the laminated core; and performing ironing for the thinned outer end portions of the steel sheets to form the stator core from the laminated core, wherein the step of performing the ironing includes:

bringing the thinned outer end portions of the steel sheets into contact with one another;

preparing a cylindrical ironing member which has an inner diameter smaller than an outer diameter of the laminated core and has a chamfered portion on an inner side of its end surface such that the chamfered portion makes an acute angle with the radial direction;

coaxially and separately placing the laminated core and the ironing member;

moving the ironing member along the axial direction such that the chamfered portion comes in contact with the thinned outer end portion of each steel sheet to give an ironing load to the thinned outer end portions, after bringing the thinned outer end portions of the steel sheets into contact with one another, and to shorten lengths of the thinned outer end portions in a radial direction of the laminated core at a predetermined value.

\* \* \* \* \*